(12) United States Patent
Maruyama et al.

(10) Patent No.: US 7,547,060 B2
(45) Date of Patent: Jun. 16, 2009

(54) SLIDING DOOR STRUCTURE

(75) Inventors: Katsuaki Maruyama, Toyota (JP); Koji Kawamatsu, Okazaki (JP); Yukio Matsuda, Okazaki (JP); Yoshinori Hitomi, Okazaki (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 313 days.

(21) Appl. No.: 11/401,884

(22) Filed: Apr. 12, 2006

(65) Prior Publication Data
US 2006/0232101 A1 Oct. 19, 2006

(30) Foreign Application Priority Data
Apr. 13, 2005 (JP) .............................. 2005-115768

(51) Int. Cl.
*B60J 5/06* (2006.01)
(52) U.S. Cl. ........................................ 296/155; 296/202
(58) Field of Classification Search ................ 296/155, 296/202, 151; 49/360, 213, 215, 212, 216
See application file for complete search history.

(56) References Cited
U.S. PATENT DOCUMENTS
3,819,228 A 6/1974 Cornacchia
6,290,283 B1 * 9/2001 Fukumoto et al. ........... 296/155

FOREIGN PATENT DOCUMENTS
| FR | 2 874 545 | 3/2006 |
| GB | 2 321 269 | 7/1998 |
| JP | 63-093214 | 6/1988 |
| JP | 02-041811 | 3/1990 |
| JP | 09-030260 | 2/1997 |
| JP | 09-272387 | 10/1997 |
| WO | WO 2006/027510 | 3/2006 |

OTHER PUBLICATIONS
European Search Report dated May 13, 2008.
* cited by examiner

*Primary Examiner*—Lori L Lyjak
(74) *Attorney, Agent, or Firm*—Finnegan, Henderson, Farabow, Garrett & Dunner, LLP

(57) ABSTRACT

To a pair of link arms, portions of a fitting mechanism that can be engaged with each other in a vehicle width direction are formed. Further, hinge bases that hold both ends of the pair of link arms rotatably can fit together in the vehicle width direction. By this structure, when a load is applied onto a sliding door from the outside of the vehicle owing to a side collision or the like, and a force is applied onto the fitting mechanism and the pair of hinge bases in the vehicle width direction and in the vehicle vertical direction, the portions of the fitting mechanism and the pair of hinge bases fit together, and the movement of the link arms to the upper side in the vehicle vertical direction is regulated. Thereby, the pulling deformation of the sliding door to the inside of the vehicle body is suppressed.

19 Claims, 11 Drawing Sheets

B-B

E-E

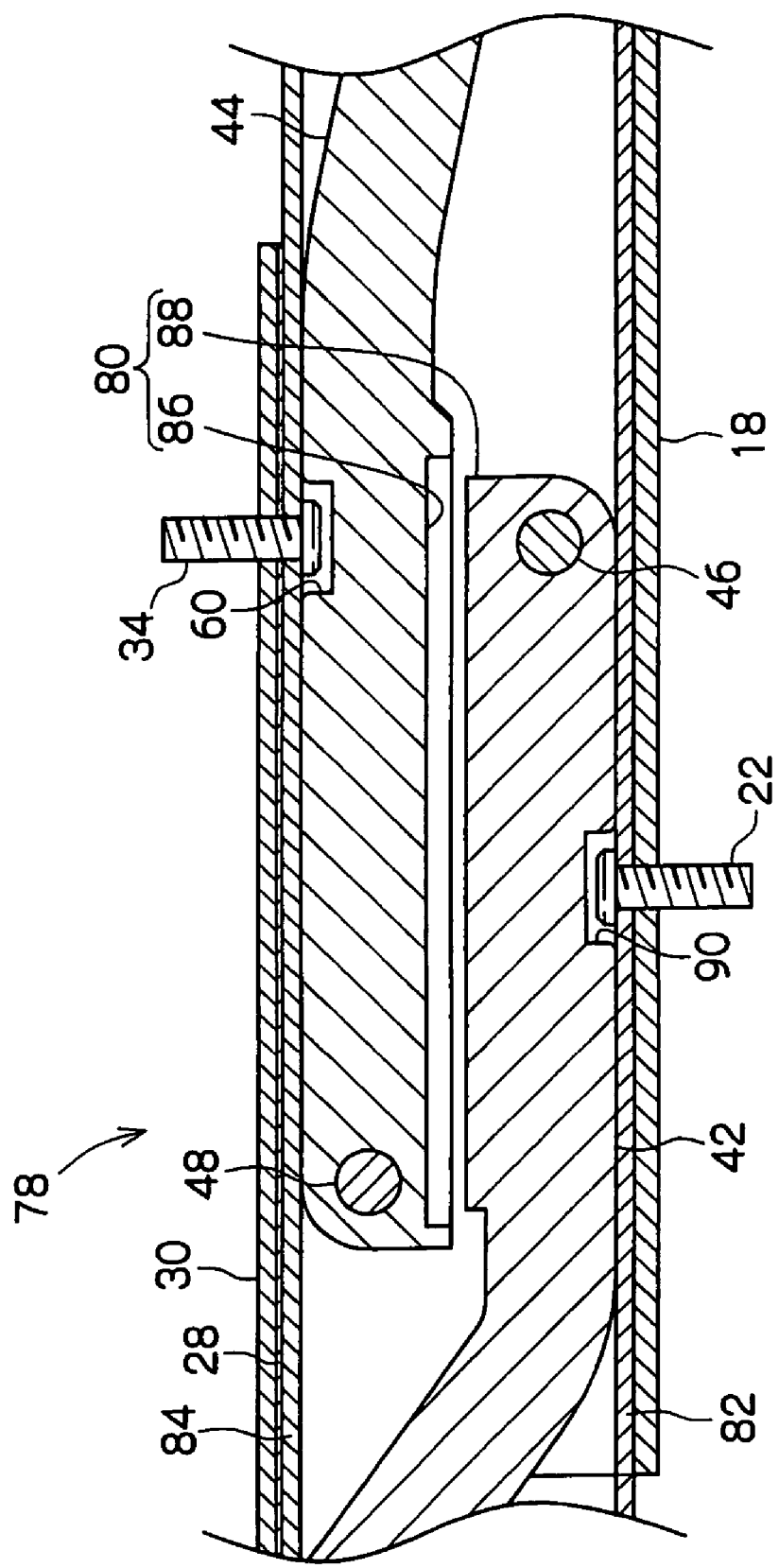

SLIDING DOOR STRUCTURE

CROSS-REFERENCE TO RELATED APPLICATION

This application claims priority under 35 USC 119 from Japanese Patent Application No. 2005-115768, the disclosure of which is incorporated by reference herein.

BACKGROUND OF THE INVENTION

1. Field of the Invention

The present invention relates to a sliding door structure, more specifically to a sliding door structure wherein deformation of the sliding door is suppressed when a load is applied onto the sliding door from the outside of a vehicle.

2. Description of the Related Art

In the prior art, as a sliding door structure wherein a door is slid in a vehicle fore-and-aft direction by a pair of arms, there is the following. (For example, refer to Japanese Utility Model Application Laid-Open (JP-U) No.63-093214 (FIG. 3).)

For example, in the example disclosed in JP-U No.63-093214, one end of the pair of arms is arranged rotatably by a supporting mechanism provided at the under side of a seat, and the other end of the pair of arms is arranged rotatably to a door. Thereby, when the pair of arms is swung, the door opens and closes along the side of a vehicle body.

Meanwhile, in this type of sliding door structure, when a load is applied onto the door from the outside of the vehicle owing to a side collision or the like, it is necessary to suppress deforming of the door.

As one for suppressing this kind of door deformation, there is the following. (For example, refer to JP-U No.02-41811 (FIG. 1, FIG. 2).)

For example, in JP-U No.02-41811, there is disclosed a stopper structure having an engaging member and a locking member.

The engaging member is attached to the rear end surface of a door inner panel, and the locking member is attached to a portion, opposing the rear end surface of the door inner panel, at a door opening portion of a vehicle body.

Further, in the locking member, an engaging hole, that faces the moving direction (door opening and closing direction) of the engaging member and opens toward the engaging member, is formed, and in the engaging member, an engaging portion that engages with the engaging hole when the door is closed is formed.

And, when a load is applied onto the door from the outside of the vehicle, the engaging portion of the engaging member is engaged with the locking hole of the locking member, and the engaging member and the locking member are engaged with each other, thereby the deformation of the door is suppressed.

However, in the sliding door structure wherein the door is slid in the fore-and-aft direction of the vehicle by the pair of arms as shown in JP-U No.63-093214, in order to assure a wide door opening, it is necessary to make the pair of arms long. Further, in order to assure the rigidity of the door in the fore-and-aft direction of the vehicle, it is necessary to make a pitch between the pair of arms large.

For this reason, when the door is closed, the pair of arms is arranged in a wide range along the vehicle fore-and-aft direction inside of the door.

Accordingly, in the sliding door structure wherein the pair of arms is arranged in a wide range along the vehicle fore-and-aft direction inside of the door when the door is closed, it is difficult to assure an exclusive space to arrange such a stopper structure as shown in JP-U No.02-41811, in the end portion of the door in the vehicle fore-and-aft direction.

SUMMARY OF THE INVENTION

The present invention has been made in consideration of the above circumstances, and accordingly, the present invention provides a sliding door structure that can suppress deformation of the sliding door owing to a side collision or the like, without providing a stopper structure to suppress the deformation of the sliding door in the end portion of the sliding door in the vehicle fore-and-aft direction.

In order to solve the above problem, according to an aspect of the invention, there is provided a sliding door structure comprising: a sliding door that opens and closes a door opening provided at a vehicle body side face; a link mechanism that is provided between the vehicle body side face and the sliding door and makes the sliding door slide in a vehicle fore-and-aft direction by at least one pair of link arms; and a movement regulating mechanism that regulates movement of the link mechanism when a load is applied onto the sliding door from outside of the vehicle.

The sliding door structure according to the aspect of the invention has the movement regulating mechanism that regulates the movement of the link mechanism when a load is applied onto the sliding door from the outside of the vehicle.

According to this structure, when a load is applied onto the sliding door from the outside of the vehicle owing to a side collision or the like, the movement of the link mechanism is regulated by the movement regulating mechanism, and the movement of the link mechanism is regulated so, thereby the deformation of the sliding door is suppressed.

Accordingly, it is possible to suppress the deformation of the sliding door owing to a side collision or the like, without providing a stopper structure to suppress the deformation of the sliding door at the end portion of the sliding door in the vehicle fore-and-aft direction.

BRIEF DESCRIPTION OF THE SEVERAL VIEWS OF THE DRAWINGS

Embodiments of the present invention will be described in detail with reference to the following figures, wherein:

FIG. 11 is a cross sectional view at the line F-F in FIG. 7.

DETAILED DESCRIPTION OF THE INVENTION

Embodiments according to the present invention will be explained in more details with reference to the attached drawings hereinafter. Meanwhile, structural components, arrangement thereof and the like explained hereinafter is not limited to the present invention, but they can be modified in various manners according to the purposes of the invention.

First Embodiment

First, the structure of a sliding door structure 10 according to a first embodiment of the invention will be explained hereinafter.

Figure 1:
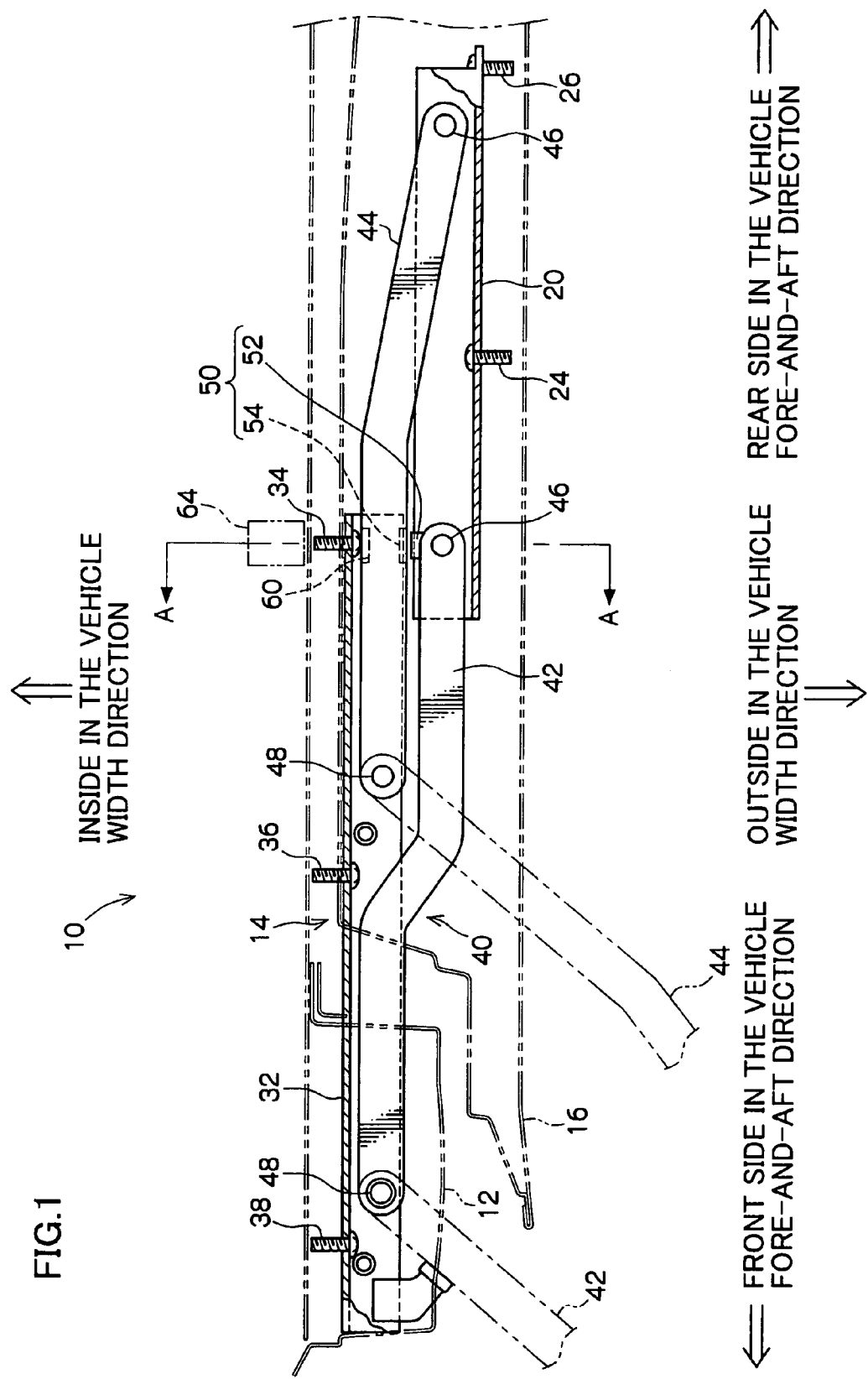
FIG. 1 is a plan view showing the structure of a sliding door structure according to a first embodiment of the invention.
Figure 2:
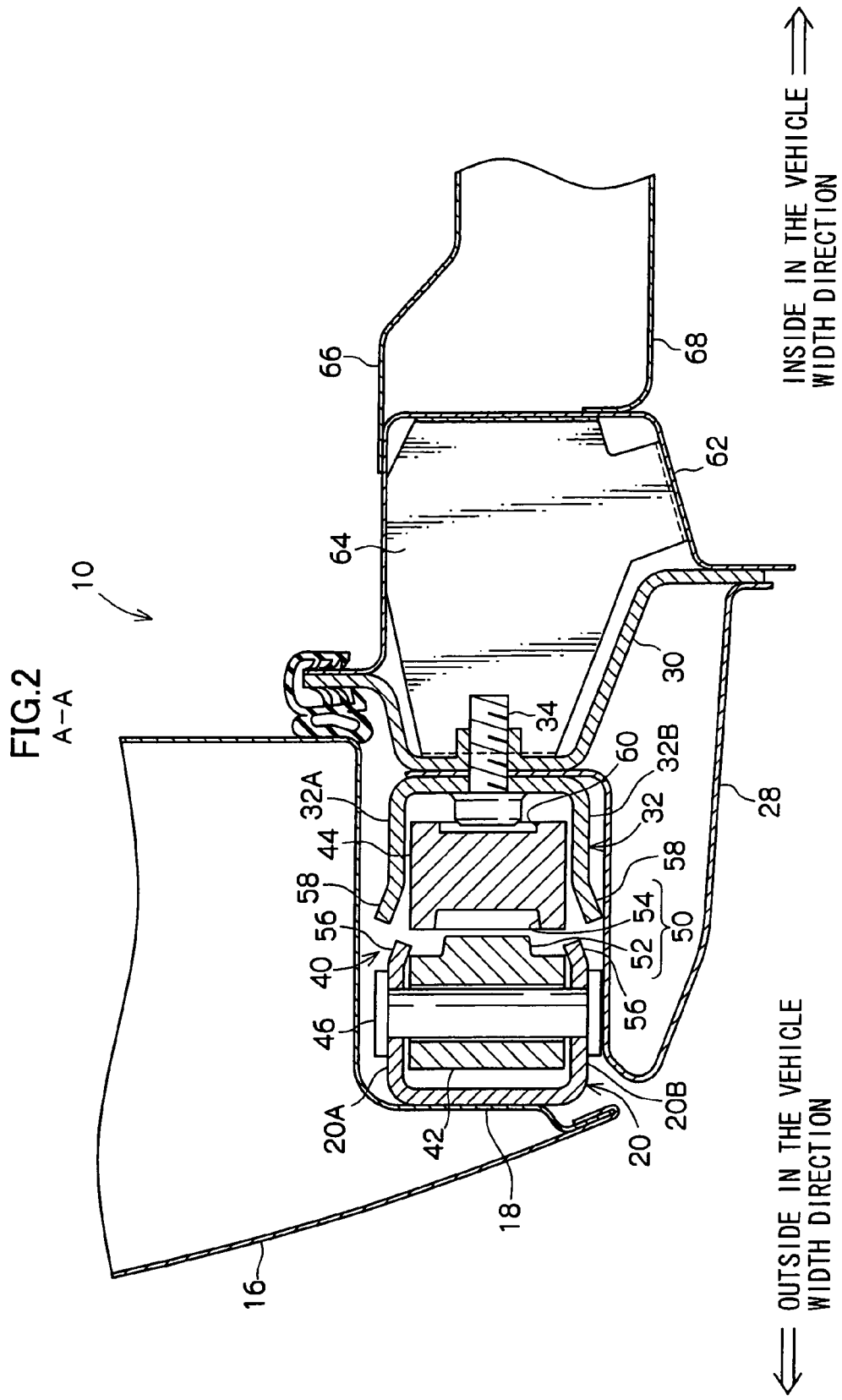
FIG. 2 is a cross sectional view at the line A-A in FIG. 1.

FIGS. 1 and 2 show the structure of a sliding door structure 10 according to the first embodiment of the invention.

The sliding door structure 10 according to the embodiment is, for example, one to be applied to a rocker portion at the front seat position of a vehicle such as a passenger car or the like.

As shown in FIG. 1, in a vehicle body side face 12, a door opening 14 is provided, and this door opening 14 is opened and closed by a sliding door 16.

To an inner panel 18 (refer to FIG. 2) of the sliding door 16, a hinge base 20 as a first holding member formed along the vehicle fore-and-aft direction is fixed with plural fasteners 24 and 26.

On the vehicle body side face 12, as shown in FIG. 2, a rocker outer panel 28 and a rocker reinforcement 30 are provided.

To a portion where the rocker outer panel 28 and the rocker reinforcement 30 are overlapped to each other, as shown in FIGS. 1 and 2, a hinge base 32 as a second holding member formed along the vehicle fore-and-aft direction is fixed with plural fasteners 34, 36, 38.

The hinge base 20 and the hinge base 32, as shown in FIG. 2, are structured each into a substantially U-shaped cross section opening in the direction to face each other.

Between the vehicle body side face 12 and the sliding door 16, a link mechanism 40 that slides the sliding door 16 in the vehicle fore-and-aft direction is arranged. This link mechanism 40 includes a pair of link arms 42 and 44.

At one end of each of the pair of link arms 42 and 44, a hinge pin 46 is provided, and at the other end of each of the pair of link arms 42 and 44, a hinge pin 48 is provided.

Both of the end portions of the hinge pin 46 in the lengthwise direction, as shown in FIG. 2, are coupled to a pair of wall portions 20A and 20B of the hinge base 20, the wall portions 20A and 20B opposing each other. Both of the end portions of the hinge pin 48 (refer to FIG. 1) in the lengthwise direction are coupled to a pair of wall portions 32A and 32B of the hinge base 32, the wall portions 32A and 32B opposing each other.

In the embodiment, both the ends of the pair of link arms 42 and 44 are rotatably held by the hinge base 20 and the hinge base 32 respectively, thereby the pair of link arms 42 and 44 can swing between the position shown in full line and the position shown in two-dot chain line.

Further, when the pair of link arms 42 and 44 swing as mentioned above, the sliding door is slid in the vehicle fore-and-aft direction.

Herein, the pair of link arms 42 and 44, as shown in FIG. 1, is arranged along the vehicle fore-and-aft direction, when the sliding door 16 is at the position to close the door opening 14.

Further, when the sliding door 16 is at the position to close the door opening 14, the link arm 42 is arranged at the sliding door side position, and the link arm 44 is arranged at the vehicle body side position.

In this configuration, the pair of link arms 42 and 44 are so structured that parts thereof in the lengthwise direction are in parallel and overlapped each other in the vehicle width direction.

Further, in the sliding door structure 10 according to the embodiment, as described in detail later herein, there is provided a movement regulating mechanism that regulates movement of the link mechanism 40 when a load is applied onto the sliding door from the outside of the vehicle owing to a side collision or the like.

In concrete, as shown in FIGS. 1 and 2, in the pair of link arms 42 and 44, a fit-together mechanism 50 in which fitting together (engaging together) is performed (clearance fitting can be performed) in the vehicle width direction is formed.

The fitting mechanism 50 includes a fit convex portion 52 formed in the link arm 42 at the sliding door side position, and a fit concave portion 54 formed in the link arm 44 at the vehicle body side face position.

And, when a load is applied onto the sliding door 16 from the outside of the vehicle owing to a side collision or the like, and a force is applied to the link arm 42 at the sliding door side position inward in the vehicle width direction, the fit convex portion 52 formed on the link arm 42 moves into the inside in the vehicle width direction and the fit convex portion 52 and the fit concave portion 54 are fitted together (engaged each other).

This fitting mechanism 50, as shown in FIG. 1, is formed along the fore-and-aft direction of the pair of link arms 42 and 44.

Further, in the embodiment, in addition to the fitting mechanism 50, the hinge base 20 and the hinge base 32 are also structured so as to be fitted together (to be close fitted) in the vehicle width direction.

In concrete, as shown in FIG. 2, a first pair of edge portions 56 inclined inward so as to come close to each other is formed at the pair of wall portions 20A and 20B formed in the hinge base 20, at the hinge base 32 side.

In the same manner, a second pair of edge portions 58 inclined outward so as to go away from each other is formed at the pair of wall portions 32A and 32B formed in the hinge base 32, at the hinge base 20 side.

And, when a load is applied onto the sliding door 16 from the outside of the vehicle owing to a side collision or the like, and a force is applied to the hinge base 20 at the sliding door side position inward in the vehicle width direction, the hinge base 20 moves to the inside in the vehicle width direction, and the first pair of edge portions 56 goes into the inside of the second pair of edge portions 58, and the hinge base 20 and the hinge base 32 are fitted together (engaged each other).

Thus, in the embodiment, by the fitting mechanism 50 formed on the pair of link arms 42 and 44, and by the pair of hinge bases 20 and 32, a movement regulating mechanism is structured.

The movement regulating mechanism structured by the fitting mechanism 50 and the pair of hinge bases 20 and 32 is provided at the central position in the vehicle fore-and-aft direction of the lower portion of the sliding door 16.

And, by the movement regulating mechanism, the movement of the link arm 42 disposed at the sliding door side position among the pair of link arms 42 and 44 is regulated.

Meanwhile, in the embodiment, as shown in FIGS. 1 and 2, a concave portion 60 is formed in the link arm 44, and this concave portion 60 and the fastener 34 can be fitted (can be clearance fitted) in the vehicle width direction.

Further, between the rocker reinforcement 30 and a rocker inner panel 62, a bulk head 64 is provided. This bulk head 64 is welded to the rocker inner panel 62 and the rocker reinforcement 30. The bulk head 64 is a member which enhances strength of the vehicle body.

In this configuration, in the embodiment, as shown in FIGS. 1 and 2, the bulk head 64 is arranged at the inside position in the vehicle width direction of the fastener 34. Further, the fastener 34 and the bulk head 64 are arranged linearly along the vehicle width direction.

The fastener 34 and the bulk head 64 structure a load transmitting mechanism, and transmit a load transmitted from the outside of the vehicle, via the sliding door 16, to the pair of link arm 42 and 44 and the pair of hinge bases 20 and 32 inward in the vehicle width direction.

And as shown in FIG. 2, in the inside of the rocker inner panel 62 at which the bulk head 64 is disposed, a cross member 66 and a floor panel 68 are disposed along the vehicle width direction.

Next, the operation and effects of the sliding door structure 10 according to the first embodiment of the invention are explained hereinafter.

Figure 3:
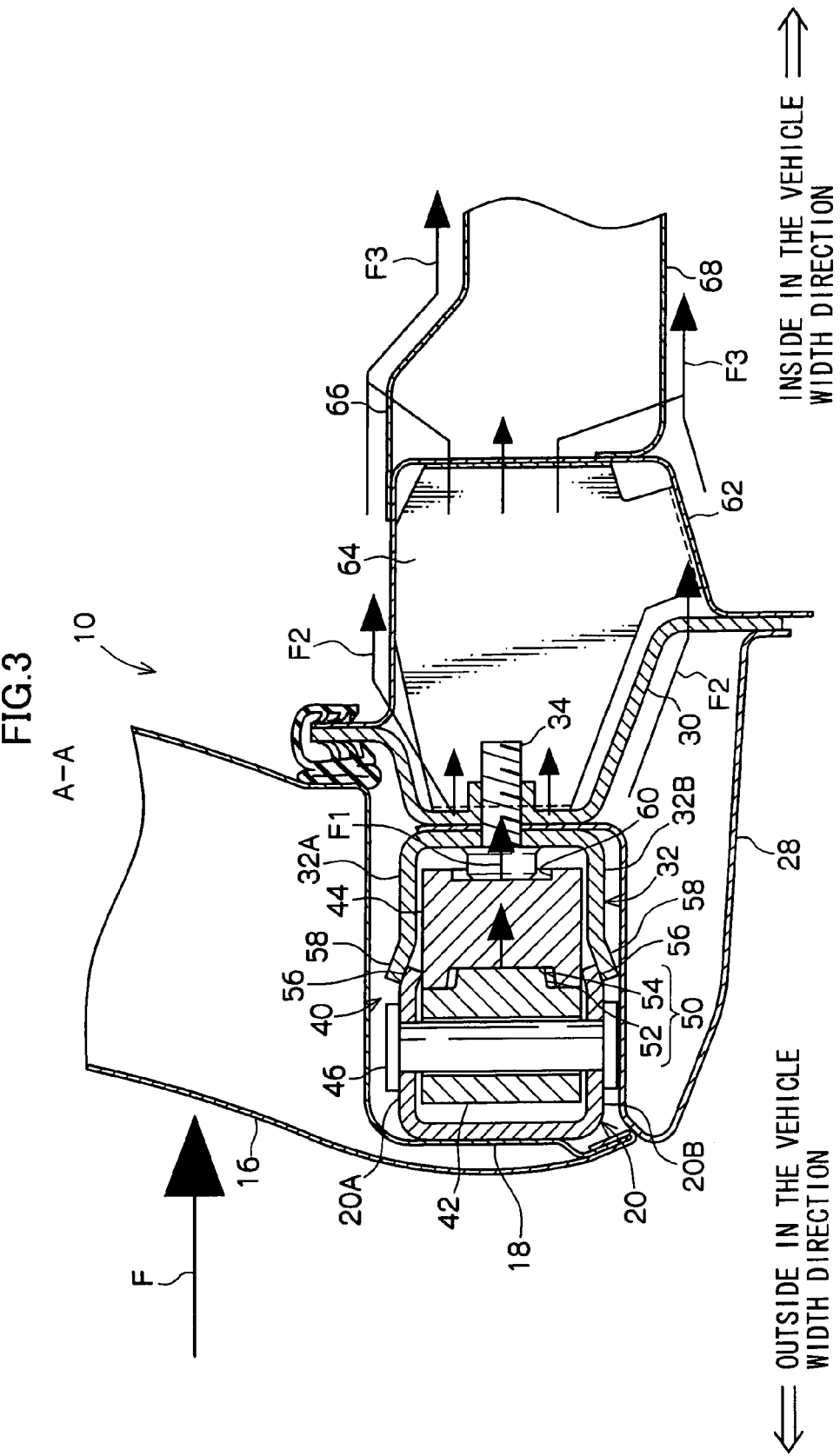
FIG. 3 is a figure for explaining how the deformation of a sliding door is prevented in the sliding door structure according to the first embodiment of the invention.

First, as shown in FIG. 3, a case where a load F is applied onto the sliding door 16 at a position from the outside of the vehicle, this position being displaced from a position where the fitting mechanism 50 and the pair of hinge bases 20 and 32 are provided toward the upper side in the vehicle vertical direction, will be explained as an example.

First, at the initial stage when the load F is applied onto the sliding door 16, the entire sliding door 16 moves to the inside in the vehicle width direction, and, since the deformation of the portion to which the load F is applied of the sliding door 16 is small, the force to the inside of the vehicle width direction is mainly applied to the link arm 42 and the hinge base 20 at the sliding door side position.

Thereby, the link arm 42 and the hinge base 20 at the sliding door side position move to the inside in the vehicle width direction.

And, as shown in FIG. 3, the fit convex portion 52 formed in the link arm 42 goes into the inside of the fit concave portion 54, and the fit convex portion 52 and the fit concave portion 54 are fitted each other.

Further, at the same time, the first pair of edge portions 56 goes into the inside of the second pair of edge portions 58, and the hinge base 20 and the hinge base 32 are fitted each other.

Then, when the load F is continuously applied onto the sliding door 16, and the deformation of the portion to which the load F is applied of the sliding door 16 becomes large gradually, the lower portion of the sliding door 16 where the link arm 42 and the hinge base 20 are provided is raised toward the upper side in the vehicle vertical direction.

Therefore, the force toward the upper side in the vehicle vertical direction is mainly applied to the link arm 42 and the hinge base 20 at the sliding door side position.

However, at this time, since the fitting mechanism 50 (the fit convex portion 52 and the fit concave portion 54) and the pair of hinge bases 20 and 32 have been already fitted in the vehicle width direction, the movement of the link arm 42 and the hinge base 20 toward the upper side in the vehicle vertical direction is regulated.

Thus, according to the embodiment, even if the load F is applied onto the position displaced toward the upper side in the vehicle vertical direction from the position where the fitting mechanism 50 and the pair of hinge bases 20 and 32 are provided, the fitting mechanism 50 (the fit convex portion 52 and the fit concave portion 54) and the pair of hinge bases 20 and 32 are fitted each other in the vehicle width direction, thereby the movement of the link arm 42 and the hinge base 20 toward the upper side in the vehicle vertical direction is regulated, and so, the dragged deformation of the sliding door 16 to the inside of passenger room is suppressed effectively.

Next, explanations are made with a case where a load F is applied onto the sliding door 16 at a position from the outside of the vehicle, this position being displaced from a position where the fitting mechanism 50 and the pair of hinge bases 20 and 32 are provided toward the upper side in the vehicle vertical direction, and being displaced toward the rear side in the vehicle fore-and-aft direction.

First, at the initial stage when the load F is applied onto the sliding door 16, the entire sliding door 16 moves to the inside in the vehicle width direction, and, since the deformation of the portion to which the load F is applied of the sliding door 16 is small, the force to the inside of the vehicle width direction is mainly applied to the link arm 42 at the sliding door side position and the hinge base 20.

Thereby, the link arm 42 and the hinge base 20 at the sliding door side position move to the inside in the vehicle width direction.

Then, the fit convex portion 52 formed in the link arm 42 goes into the inside of the fit concave portion 54, and the fit convex portion 52 and the fit concave portion 54 are fitted together.

Further, at the same time, the first pair of edge portions 56 goes into the inside of the second pair of edge portions 58, and the hinge base 20 and the hinge base 32 are fitted together.

And, when the load F is continuously applied onto the sliding door 16, and the deformation of the portion to which the load F is applied of the sliding door 16 gradually becomes larger, the lower portion of the sliding door 16 where the link arm 42 and the hinge base 20 are provided is raised toward the upper side in the vehicle vertical direction and is dragged to the rear side in the vehicle fore-and-aft direction.

Therefore, the force toward the upper side in the vehicle vertical direction and the rear side in the vehicle fore-and-aft direction is mainly applied to the link arm 42 and the hinge base 20 at the sliding door side position.

However, at this time, the fitting mechanism 50 (the fit convex portion 52 and the fit concave portion 54) and the pair of hinge bases 20 and 32 have been already fitted each other in the vehicle width direction, the movement of the link arm 42 and the hinge base 20 toward the upper side in the vehicle vertical direction and the rear side in the vehicle fore-and-aft direction is regulated.

Thus, according to the embodiment, even if the load F is applied onto the position displaced toward the upper side in the vehicle vertical direction and the rear side in the vehicle fore-and-aft direction from the position where the fitting mechanism 50 and the pair of hinge bases 20 and 32 are provided, the fitting mechanism 50 (the fit convex portion 52 and the fit concave portion 54) and the pair of hinge bases 20 and 32 are fitted each other in the vehicle width direction, thereby the movement of the link arm 42 and the hinge base 20 toward the upper side in the vehicle vertical direction and the rear side in the vehicle fore-and-aft direction is regulated, and so, the dragged deformation of the sliding door 16 to the inside of passenger room is suppressed effectively.

Further, also in a case where a load F is applied onto the sliding door 16 at a position from the outside of the vehicle, this position being displaced from a position where the fitting mechanism 50 and the pair of hinge bases 20 and 32 are provided toward the upper side in the vehicle vertical direction, and being displaced toward the front side in the vehicle fore-and-aft direction, in the same manner as mentioned above, the dragged deformation of the sliding door 16 to the inside of passenger room is suppressed effectively.

Thus, in the sliding door structure 10 according to the embodiment, by the fitting mechanism 50 formed in the pair of link arms 42 and 44 and the fit-portions 56 and 58 of the pair of hinge bases 20 and 32, the movement of the link arm 42 and the hinge base 20 is regulated and the dragged deformation of the sliding door 16 to the inside of passenger room is suppressed.

Accordingly, it is possible to suppress the deformation (especially the dragged deformation to the inside of passenger room) of the sliding door 16 owing to a side collision or the like, without providing a stopper structure for suppressing the deformation of the sliding door 16 at the end portion of the sliding door in the vehicle fore-and-aft direction.

Thereby, it is possible to eliminate the need for providing an exclusive space for a stopper structure in the end portion of the sliding door in the vehicle fore-and-aft direction.

Further, in the embodiment, the fitting mechanism 50, that is, the fit convex portion 52 and the fit concave portion 54, formed in the pair of link arms 42 and 44 are fitted each other, and the pair of hinge bases 20 are 32 is fitted each other, thereby the movement of the link arm 42 disposed at the sliding door side position among the pair of link arms 42 and 44 is regulated.

By this structure, in comparison with a case where the movement of the link arm 44 arranged at the vehicle body side face position is regulated, the rigidity of the sliding door against a load F toward the vehicle inside can be enhanced.

Accordingly, it is possible to increase the effect to suppress the deformation of the sliding door against a side collision or the like, and therefore, it is possible to reduce the reinforcement amount for the pair of link arms 42 and 44 and the vehicle body side face 12.

Furthermore, in the sliding door structure 10 according to the embodiment, the deformation of the sliding door 16 is suppressed by use of the fitting force of the fitting mechanism 50 and the fitting force of the pair of hinge bases 20 and 32, thereby, it is possible to securely attain the effect to suppress the deformation of the sliding door 16 against a side collision or the like.

Moreover, in the sliding door structure 10 according to the embodiment, when the hinge base 20 and the hinge base 32 are fitted each other, even when a force pushing the wall portions 20A and 20B and narrowing a gap between the wall portions 20A and 20B is applied onto the pair of wall portions 20A and 20B opposing each other of the hinge base 20, because the both of the end portions of the hinge pin 46 in the lengthwise direction are connected to the pair of wall portions 20A and 20B, the gap between the pair of wall portions 20A and 20B is prevented (suppressed) from narrowing.

In the same manner, when the hinge base 20 and the hinge base 32 are fitted each other, even when a force pushing the wall portions 32A and 32B and widening a gap between the wall portions 32A and 32B is applied onto the pair of wall portions 32A and 32B opposing each other of the hinge base 32, because the both of the end portions of the hinge pin 48 in the lengthwise direction are coupled to the pair of wall portions 32A and 32B, the gap between the pair of wall portions 32A and 32B is prevented (suppressed) from widening.

Thereby, it is possible to maintain the fitting force at the time when the hinge base 20 and the hinge base 32 are fitted, as a result, it is possible to prevent (suppress) the effect (the effect of suppressing the deformation of the sliding door) from decreasing.

Further, in the sliding door structure 10 according to the embodiment, the fitting mechanism 50 is formed in the pair of link arms 42 and 44, and the pair of hinge base 20 and 32 are structured to be fitted each other, and thereby the deformation of the sliding door 16 is suppressed, therefore, there is no need to provide a new member (another member) at the sliding door 16 or the vehicle body.

Thereby, it is possible to make the manufacturing costs by the adding a structure for suppressing the deformation of the sliding door 16 to minimum, and, it is possible to eliminate the need for providing a new stopper structure for regulating the movement of the link arm 42, and any additional parts and an exclusive arrangement space are not necessary.

Furthermore, in the sliding door structure 10 according to the embodiment, when a load F is applied onto the sliding door 16 from the outside of the vehicle owing to a side collision or the like and the sliding door 16 is deformed, the fastener 34 is fitted with (engageably inserted into) the concave portion 60 formed in the link arm 44, and the load F1 transmitted, via the sliding door 16, to the pair of link arms 42 and 44 and the pair of hinge bases 20 and 32 is transmitted into the inside in the vehicle width direction, as shown by arrows F2 and F3 in FIG. 3, via the hinge base 32 and the rocker reinforcement 30 connected by the fastener 34, the bulk head 64 welded to the rocker reinforcement 30, the rocker inner panel 62 connected to the rocker reinforcement 30 and welded thereto the bulkhead 64, and a cross member 66 (including front and rear wall) connected to the rocker inner panel 62.

And, the load F1 transmitted via the sliding door 16 to the pair of link arms 42 and 44 and the pair of hinge bases 20 and 32 is transmitted to the inside in the vehicle width direction as mentioned above, thereby the load F1 applied onto the pair of link arms 42 and 44 and the pair of hinge base 20 and 32 is dispersed to the inside in the vehicle width direction (the opposite side of the side collision).

Accordingly, because the movement of the link arm 44 and the hinge base 32 to the inside of the vehicle width direction is prevented, it is possible to maintain a state where the fitting mechanism 50 (the fit convex portion 52 and the fit concave portion 54) and the pair of hinge bases 20 and 32 can fitted each other.

Thereby, it is possible to prevent (suppress) the effect of regulating the movement of the link arm 42 and the hinge base 20 by the fitting mechanism 50 and the pair of hinge bases 20 and 32 from decreasing, as a result, it is possible to maintain the effect of suppressing the deformation of the sliding door 16 owing to a side collision or the like.

Especially, in the sliding door structure 10 according to the embodiment, the fastener 34 and the bulk head 64 are arranged linearly along the vehicle width direction.

According to this structure, when the load F1 transmitted via the sliding door 16 to the pair of link arms 42 and 44 and the pair of hinge bases 20 and 32 is transmitted to the inside in the vehicle width direction as mentioned above, the load is transmitted linearly in the vehicle width direction, therefore, the transmission loss of the load can be decreased.

Accordingly, the load F1 applied onto the link arm 44 and the hinge base 32 is dispersed efficiently to the inside in the vehicle width direction.

Thereby, the movement of the link arm 44 and the hinge base 32 to the inside in the vehicle width direction is securely prevented, thereby it is possible to maintain the state where the fitting mechanism 50 and the pair of hinge bases 20 and 32 can be fitted each other.

Accordingly, it is possible to further securely prevent (suppress) the effect of regulating the movement of the link arm 42 and the hinge base 20 by the fitting mechanism 50 and the pair of hinge bases 20 and 32 from decreasing, and so, it is possible to securely maintain the effect of suppressing the deformation of the sliding door 16 against a side collision or the like.

Next, modified examples of the sliding door structure 10 according to the first embodiment are explained hereinafter.

In the above embodiment, the fit convex portion 52 is formed in the link arm 42 at the sliding door side position, and the fit concave portion 54 is formed in the link arm 44 at the vehicle body side face position, meanwhile, the fit concave portion 54 may be formed in the link arm 42 at the sliding door side position, and the fit convex portion 52 may be formed in the link arm 44 at the vehicle body side face position.

Further, in the above embodiment, the first pair of edge portions 56 is formed inclined inward so as to come close to each other, and the second pair of edge portions 58 is formed inclined outward so as to go away from each other, meanwhile, the first pair of edge portions 56 may be formed inclined outward so as to go away from each other, and the second pair of edge portions 58 may be formed inclined inward so as to come close to each other.

Furthermore, in the above embodiment, the fitting mechanism 50 (the fit convex portion 52 and the fit concave portion 54) formed in the pair of link arms 42 and 44, and the hinge base 20 and the hinge base 32 are fitted each other in the vehicle width direction, meanwhile, the structure may be made so that only the fitting mechanism 50, that is, the fit convex portion 52 and the fit concave portion 54 are fitted. Further, the structure may be made so that only the hinge base 20 and the hinge base 32 are fitted.

Further, in the above embodiment, the fit convex portion 52 and the fit concave portion 54 are clearance fitted, meanwhile, the fit convex portion 52 and the fit concave portion 54 may be so structured as to be fitted each other by a close fit or an interference fit (a fit in which there occurs a clearance or an interference owing to tolerance of the fit convex portion 52 and the fit concave portion 54) or the like.

Moreover, in the above embodiment, the hinge base 20 and the hinge base 32 are so structured as to be close fitted each other, meanwhile, the hinge base 20 and the hinge base 32 may be so structured as to be fitted each other by a clearance fit or an interference fit (a fit in which there occurs a clearance or an interference owing to the tolerance of the hinge base 20 and the hinge base 32) or the like.

Further, in the above embodiment, the concave portion 60 formed in the link arm 44 and the fastener 34 are so structured as to be clearance fitted, meanwhile, the concave portion 60 formed in the link arm 44 and the fastener 34 may be so structured as to be fitted by a close fit or an interference fit (a fit where there occurs a clearance or an interference owing to the tolerance of the fastener 34 and the concave portion 60) or the like.

Furthermore, in the above embodiment, the hinge base 20 and the hinge base 32 are so structured as to be fitted in the vehicle width direction, meanwhile, by appropriately providing concave and convex portions in the hinge base 20 and the hinge base 32, the hinge base 20 and the hinge base 32 may be so structured as to be engaged with each other at least one of in the vehicle vertical direction and in the vehicle fore-and-aft direction.

Moreover, in the above embodiment, the bulk head 64 and the cross member 66 are provided at the vehicle body side face 12, meanwhile, in a case where the strength of the rocker reinforcement 30 is secured sufficiently, a structure without the bulk head 64 and the cross member 66 may be possible.

Further, in the above embodiment, the sliding door structure 10 is applied to the rocker portion at the front seat position of a vehicle, meanwhile, the sliding door structure 10 may be applied to the roof side portion of a vehicle, and also may be applied to both of the rocker portion and the roof side portion. Furthermore, the sliding door structure 10 may be applied to the roof side portion and the rocker portion at the rear seat position of a vehicle.

Second Embodiment

Next, the structure of a sliding door structure 70 according to a second embodiment of the invention will be explained hereinafter.

Figure 4:
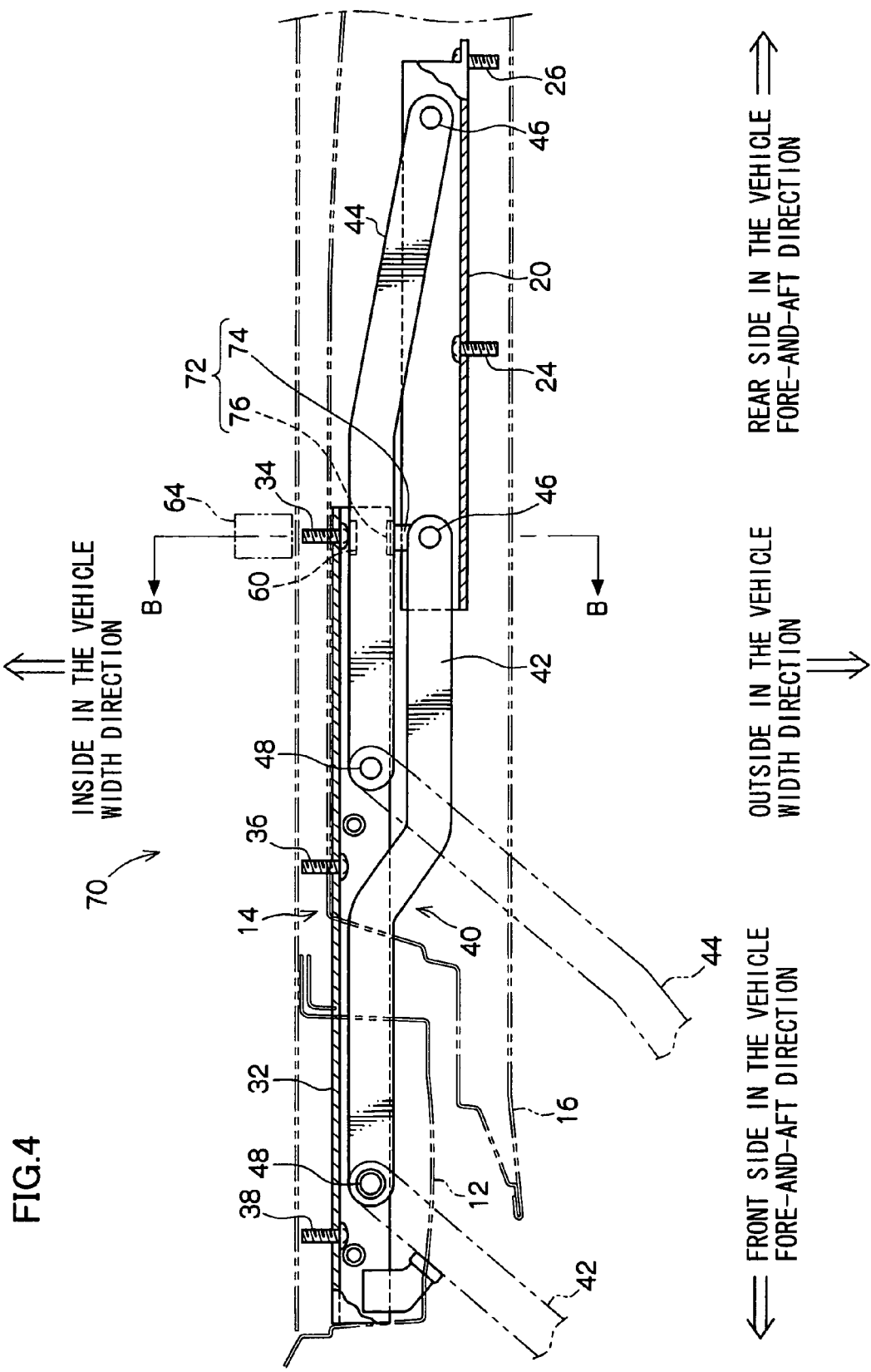
FIG. 4 is a plan view showing the structure of a sliding door structure according to a second embodiment of the invention.
Figure 5:
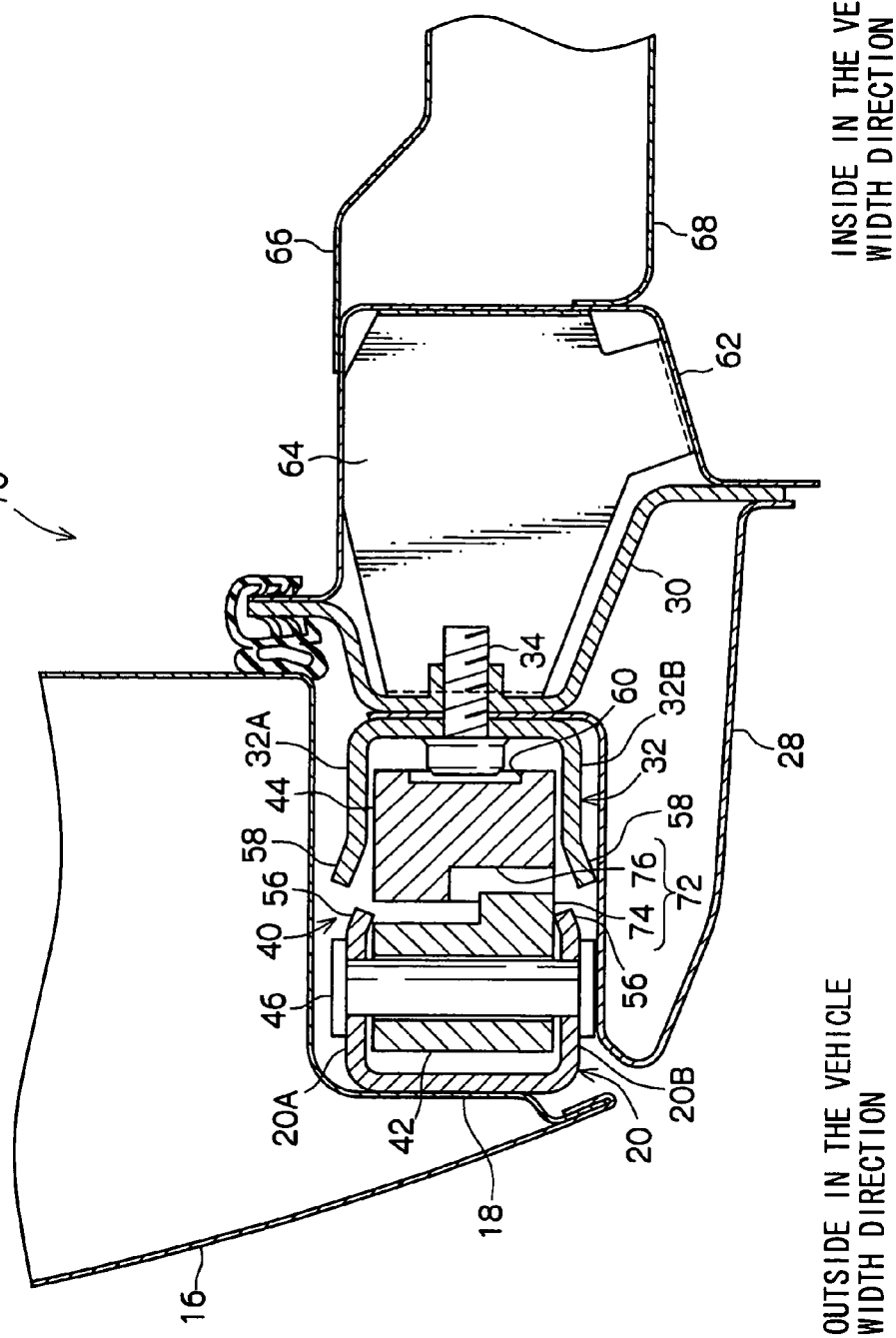
FIG. 5 is a cross sectional view at the line B-B in FIG. 4.

FIGS. 4 and 5 show the structure of the sliding door structure 70 according to the second embodiment of the invention.

In the structure of the sliding door structure 70 according to the second embodiment of the invention, the same reference numerals are allotted to the same components as in the sliding door structure 10 according to the above first embodiment, and explanations thereof are omitted.

In the second embodiment of the invention, as shown in FIGS. 4 and 5, in a pair of link arms 42 and 44, an engaging mechanism 72 where engaging each other in the vehicle vertical direction and the vehicle fore-and-aft direction is performed is formed.

This engaging mechanism 72 includes an engaging convex portion 74 formed in the link arm 42 at the sliding door side position, and an engaging concave portion 76 formed in the link arm 44 at the vehicle body side face position.

The engaging convex portion 74 and the engaging concave portion 76 are structured to have a lower side protruding wall portion in the vehicle vertical direction and an upper side protruding wall portion in the vehicle vertical direction respectively so as to be able to engage each other.

And, when a load is applied onto the sliding door 16 from the outside of the vehicle owing to a side collision or the like, and a force is applied, to the link arm 42 at the sliding door side position, toward the upside in the vehicle vertical direction and the front side or the rear side in the vehicle fore-and-aft direction, the engaging convex portion 74 formed on the link arm 42 moves to the upper side in the vehicle vertical direction and in the front side or the rear side in the vehicle fore-and-aft direction, and the engaging convex portion 74 and the engaging concave portion 76 are engaged each other.

In this configuration, in the embodiment, in order to prevent (suppress) the lower portion of the sliding door 16 from being lifted and the sliding door 16 from being dragged into the inside of the passenger room at the time of a side collision, which will be described later herein, the engaging convex portion 74 and the engaging concave portion 76 are formed at the lower side in the vehicle vertical direction, and the engaging convex portion 74 is engaged with an upper wall surface in the engaging concave portion 76, the upper wall surface being a wall surface positioned at the upper side in the vehicle vertical direction in the engaging concave portion 76.

Further, this engaging mechanism 72 is formed along the lengthwise direction of the pair of link arms 42 and 44.

In this way, in the embodiment, by the engaging mechanism 72 formed on the pair of link arms 42 and 44, and the pair of hinge bases 20 and 32, a movement regulating mechanism is structured.

The movement regulating mechanism structured by the engaging mechanism 72 and the pair of hinge bases 20 and 32 is provided at the central position in the vehicle fore-and-aft direction of the lower portion of the sliding door 16.

And, by the movement regulating mechanism, the movement of the link arm 42 disposed at the sliding door side position among the pair of link arms 42 and 44 is regulated.

Next, the operation and effects of the sliding door structure 70 according to the second embodiment of the invention are explained hereinafter.

Figure 6:
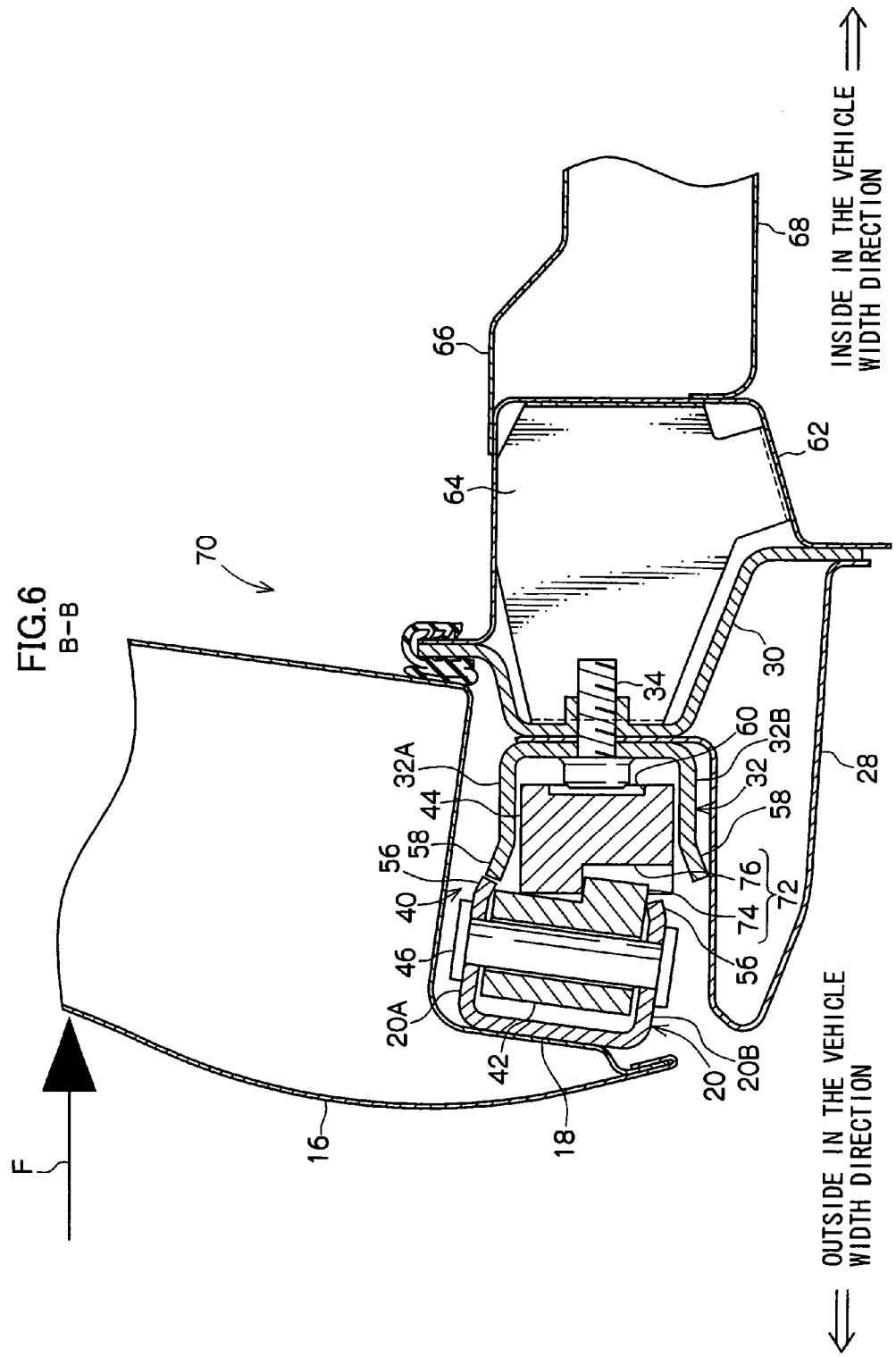
FIG. 6 is a figure for explaining how the deformation of a sliding door is prevented in the sliding door structure according to the second embodiment of the invention.
Figure 7:
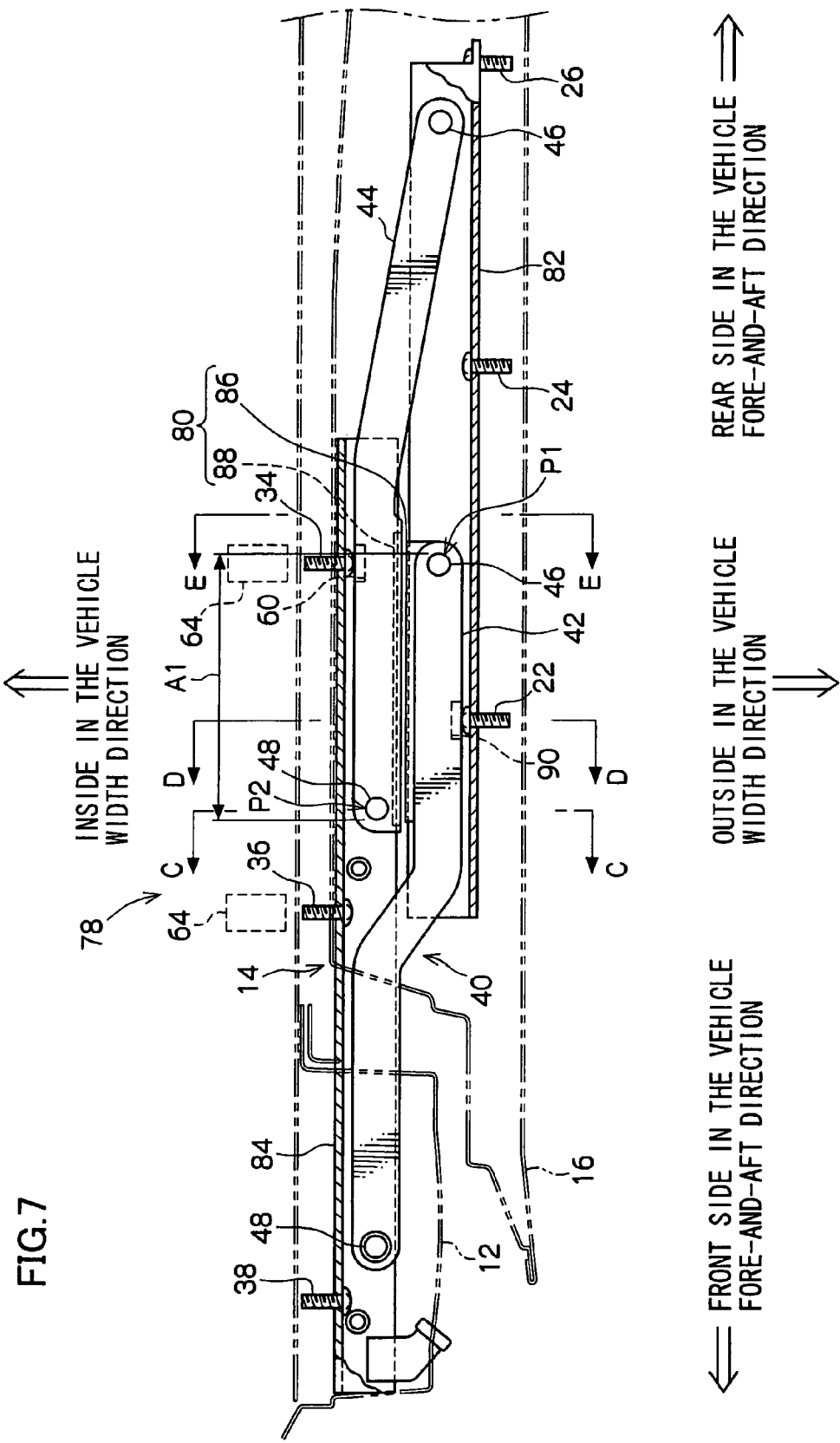
FIG. 7 is a plan view showing the structure of a sliding door structure according to a third embodiment of the invention.
Figure 8:
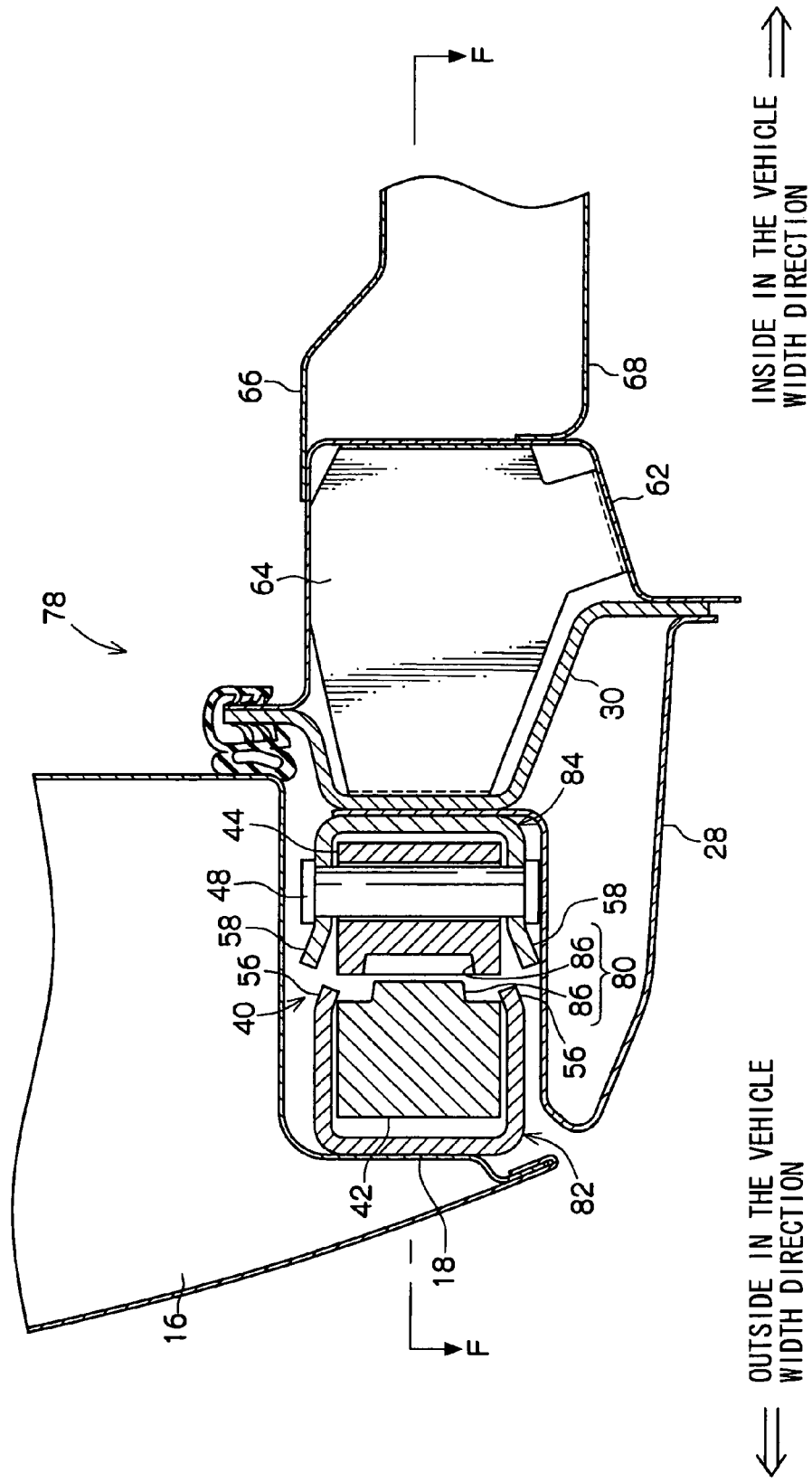
FIG. 8 is a cross sectional view at the line C-C in FIG. 7.
Figure 9:
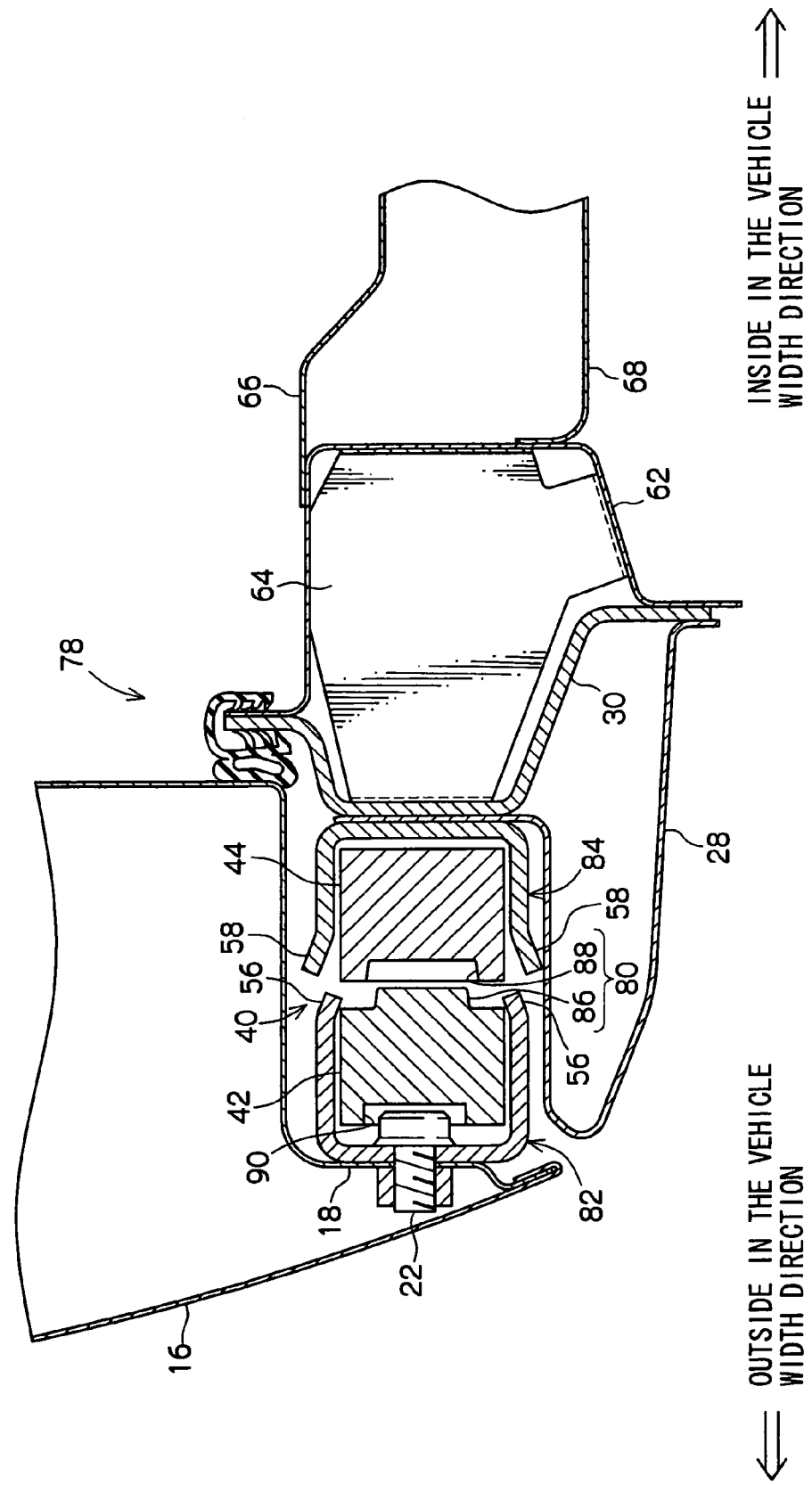
FIG. 9 is a cross sectional view at the line D-D in FIG. 7.
Figure 10:
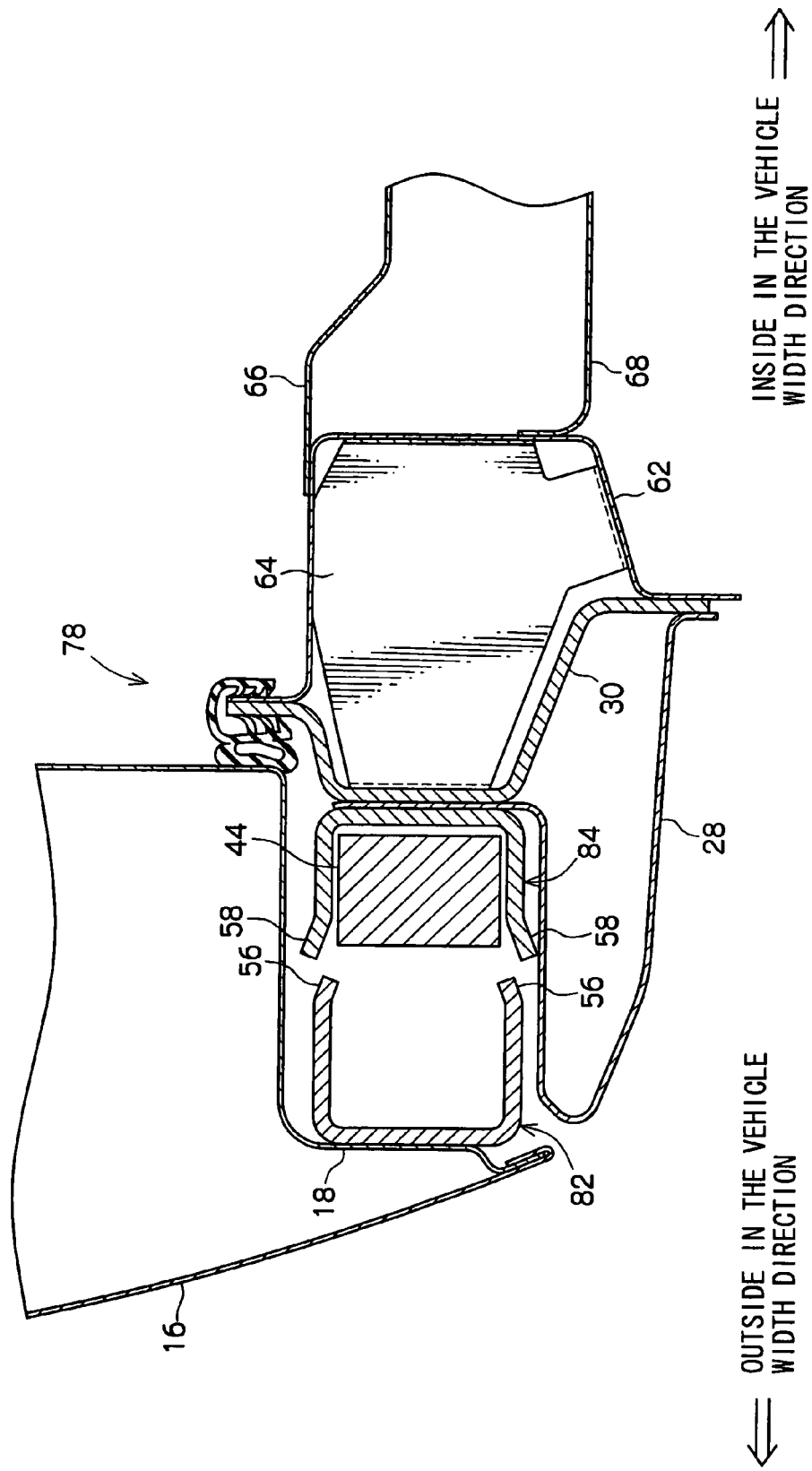
FIG. 10 is a cross sectional view at the line E-E in FIG. 7.

First, as shown in FIG. 6, a case where a load F is applied onto the sliding door 16 at a position from the outside of the vehicle, this position being displaced from the position where the engaging mechanism 72 and the pair of hinge bases 20 and 32 are provided toward the upper side in the vehicle vertical direction (further upper side than that in FIG. 3) will be explained as an example.

In the sliding door structure 70 according to the embodiment, as shown in FIG. 6, when the load F is applied onto the sliding door 16 at the position from the outside of the vehicle, which position is displaced from the position where the engaging mechanism 72 and the pair of hinge bases 20 and 32 are provided toward the upper side in the vehicle vertical direction, from the initial stage when the load F is applied onto the sliding door 16, the lower portion, where the hinge base 20 and the link arm 42 are provided, of the sliding door 16 is raised to the upper side in the vehicle vertical direction.

Therefore, the force toward the upper side in the vehicle vertical direction is applied to the link arm 42 and the hinge base 20 at the sliding door side position.

Thereby, the link arm 42 and the hinge base 20 at the sliding door side position move to the upper side in the vehicle vertical direction.

And, the engaging convex portion 74 formed in the link arm 42 moves to the upper side in the vehicle vertical direction, and the engaging convex portion 74 and the engaging concave portion 76 are engaged with each other.

Thus, according to the embodiment, even if the load F is applied onto the position displaced from the position where the engaging mechanism 72 and the pair of hinge bases 20 and 32 are provided toward the upper side in the vehicle vertical direction, the engaging mechanism 72, that is, the engaging convex portion 74 and the engaging concave portion 76 engage each other in the vehicle vertical direction, thereby the movement of the link arm 42 toward the upper side in the vehicle vertical direction is regulated, and so, the dragged deformation of the sliding door 16 to the inside of passenger room is suppressed effectively.

Next, explanations are made with a case where the load F is applied onto the sliding door 16 at a position from the outside of the vehicle, the position being displaced from the position where the engaging mechanism 72 and the pair of hinge bases 20 and 32 are provided toward the upper side (further upper side than the case in FIG. 3) in the vehicle vertical direction and being displaced to the rear side in the vehicle fore-and-aft direction.

In the sliding door structure 70 according to the embodiment, for example, when the load F is applied onto the sliding door 16 from the outside of the vehicle at the position displaced from the position where the engaging mechanism 72 and the pair of hinge bases 20 and 32 are provided toward the upper side in the vehicle vertical direction and displaced to the rear side in the vehicle fore-and-aft direction, from the initial stage when the load F is applied onto the sliding door 16, the lower portion, where the link arm 42 and the hinge base 20 are provided, of the sliding door 16 is raised to the upper side in the vehicle vertical direction and dragged to the rear side in the vehicle fore-and-aft direction.

Therefore, the force to the upper side in the vehicle vertical direction and to the rear side in the vehicle fore-and-aft direction is applied to the link arm 42 and the hinge base 20 at the sliding door side position.

Thereby, the link arm 42 and the hinge base 20 at the sliding door side position move to the upper side of the vehicle vertical direction and to the rear side in the vehicle fore-and-aft direction.

And, the engaging convex portion 74 formed in the link arm 42 moves to the upper side in the vehicle vertical direction and to the rear side in the vehicle fore-and-aft direction, and the engaging convex portion 74 and the engaging concave portion 76 are engaged with each other.

Thus, according to the embodiment, even if the load F is applied onto the position displaced from the position where the engaging mechanism 72 and the pair of hinge bases 20 and 32 are provided toward the upper side in the vehicle vertical direction and toward the rear side in the vehicle fore-and-aft direction, the engaging mechanism 72, that is, the engaging convex portion 74 and the engaging concave portion 76 engage each other in the vehicle vertical direction and in the vehicle fore-and-aft direction, thereby the movement of the link arm 42 to the upper side in the vehicle vertical direction and to the rear side in the vehicle fore-and-aft direction is regulated, and so, the dragged deformation of the sliding door 16 to the inside of passenger room is suppressed effectively.

Further, in a case where the load F is applied onto the sliding door 16 from the outside of the vehicle at the position displaced from the position where the engaging mechanism 72 and the pair of hinge bases 20 and 32 are provided toward the upper side in the vehicle vertical direction and displaced to the front side in the vehicle fore-and-aft direction, in the same manner as mentioned above, the dragged deformation of the sliding door 16 to the inside of passenger room is suppressed effectively.

Further, in the sliding door structure 70 according to the embodiment, the deformation of the sliding door 16 is suppressed by use of the engaging force of the engaging mechanism 72.

Thereby, it is possible to securely attain the effect to suppress the deformation of the sliding door 16 against a side collision or the like.

Meanwhile, in the sliding door structure 70 according to the second embodiment, the operation and effects accompanying the same structure as that of the sliding door structure 10 according to the above first embodiment should be referred to the explanations of the above first embodiment, and the explanations thereof are omitted herein.

Next, modified examples of the sliding door structure 70 according to the second embodiment are explained hereinafter.

In the above embodiment, the engaging mechanism 72 is formed such that engaging each other in the vehicle vertical direction and the vehicle fore-and-aft direction can be performed, meanwhile, the engaging mechanism 72 may be formed such that engaging each other at least one of in the vehicle vertical direction and in the vehicle fore-and-aft direction can be performed.

Further, in the above embodiment, the engaging convex portion 74 is formed on the link arm 42 at the sliding door side position, and the engaging concave portion 76 is formed in the link arm 44 at the vehicle body side face position, meanwhile, the engaging concave portion 76 may be formed in the link arm 42 at the sliding door side position, and the engaging convex portion 74 may be formed on the link arm 44 at the vehicle body side face position.

In this configuration, in order to prevent the dragged deformation of the sliding door 16 to the inside of the passenger room, it is preferable that the engaging convex portion 74 and the engaging concave portion 76 are formed on the upper side in the vehicle vertical direction, and the engaging convex portion 74 is engaged with a lower wall surface in the engaging concave portion 76, the lower wall surface being a wall surface positioned at the lower side in the vehicle vertical direction in the engaging concave portion 76.

Furthermore, in the above embodiment, the engaging mechanism 72 is formed in the pair of link arms 42 and 44, and the pair of hinge bases 20 and 32 are structured so as to be fitted with each other in the vehicle width direction, meanwhile, another structure may be made wherein the engaging mechanism 72 is formed in the pair of link arms 42 and 44, and the pair of hinge bases 20 and 32 are structured so as to be fitted each other at least in one of the vehicle width direction and the vehicle fore-and-aft direction.

Moreover, in the above embodiment, only the engaging mechanism 72 is formed in the pair of link arms 42 and 44, meanwhile, in addition to the engaging mechanism 72 formed in the pair of link arms 42 and 44, an fitting mechanism 50 according to the above first embodiment may be formed therein.

In addition, in the second embodiment of the invention, the same structure as in the first embodiment may be modified in the same manner as in the first embodiment.

Third Embodiment

Next, the structure of a sliding door structure 78 according to a third embodiment of the invention will be explained hereinafter.

FIGS. 7 through 11 show the structure of the sliding door structure 78 according to the third embodiment of the invention.

Meanwhile, in the structure of the sliding door structure 78 according to the third embodiment of the invention, the same reference numerals are allotted to the same components as in the sliding door structure 10 according to the above first embodiment, and explanations thereof are omitted.

In the third embodiment of the invention, a rotating connecting portion P1 of the link arm 42 which is provided at the sliding door side position (the link arm 42 is rotatably connected to the sliding door 16 at the rotating connecting portion P1) is disposed at a position, this position being further away in the vehicle width direction from the vehicle body side face 12 with a distance corresponding to a length of the link arm 42 in the vehicle width direction. Accordingly, the rigidity of the rotating connecting portion P1 is lower than that of a rotating connecting portion P2 of the link arm 44 which is provided at the vehicle body side face position (the link arm 44 is rotatably connected to the vehicle body side face 12 at the rotating connecting portion P2).

Therefore, in the third embodiment of the invention, in a range including at least an area A1 in the vehicle fore-and-aft direction including the rotating connecting portion P1 with the sliding door 16 of the link arm 42 and the rotating connecting portion P2 with the vehicle body side face 12 of the link arm 44, an fitting mechanism 80 (structured with a fit convex portion 86 and a fit concave portion 88) formed in the pair of link arms 42 and 44, and a first hinge base 82 and a second hinge base 84 are structured so as to be fitted each other in the vehicle width direction.

The first hinge base 82 is fixed with plural fasteners 22, 24, 26.

In addition, at a portion of the link arm 42 where the fastener 22 is positioned, a concave portion 90 is formed, and this concave portion 90 and the fastener 22 can be fitted (can be clearance fitted) in the vehicle width direction.

Next, the operation and effects of the sliding door structure 78 according to the third embodiment of the invention are explained hereinafter.

In the sliding door structure 78 according to the third embodiment of the invention, in the range at least including the area A1 in the vehicle fore-and-aft direction including the rotating connecting portion P1 with the sliding door 16 of the link arm 42 and the rotating connecting portion P2 with the vehicle body side face 12 of the link arm 44, the fitting mechanism 80 (structured with the fit convex portion 86 and the fit concave portion 88) formed in the pair of link arms 42 and 44, and the first hinge base 82 and the second hinge base 84 are structured so as to be able to fit each other in the vehicle width direction.

According to this structure, it is possible to compensate shortage of the rigidity of the rotating connecting portion P1 with the sliding door 16 of the link arm 42 provided at the sliding door side position, by the rotating connecting portion P2 with the vehicle body side face 12 of the link arm 44 provided at the vehicle body side face position.

Thereby, it is possible to attain the effect to suppress the deformation of the sliding door 16 against a side collision or the like, without separately reinforcing a portion of the rotating connecting portion P1 with the sliding door 16 of the link arm 42 provided at the sliding door side position.

Further, in the sliding door structure 78 according to the third embodiment, the fitting mechanism 80, and fittable portions of the pair of hinge bases 82 and 84 are formed longer along the lengthwise direction of the pair of link arms 42 and 44, than in the structure according to the first embodiment.

According to this structure, when a load is applied onto the sliding door 16 from the outside of the vehicle owing to a side collision or the like, and a force is applied onto the fitting mechanism 80 and the pair of hinge bases 82 and 84 in the vehicle width direction, the fitting mechanism 80 and the pair of hinge bases 82 and 84 are fitted each other in the vehicle width direction in a wide range along the vehicle fore-and-aft direction.

Accordingly, it is possible to support (receive) the load applied onto the sliding door 16 from the outside of the vehicle owing to a side collision or the like in the wide range along the vehicle fore-and-aft direction.

Thereby, it is possible to attain the effect to suppress the deformation of the sliding door against a side collision or the like in the wide range along the vehicle fore-and-aft direction.

Further, the fitting mechanism 80, and the fitting mechanism of the pair of hinge bases 82 and 84 are formed in long manner along the lengthwise direction of the pair of link arms 42 and 44, and so, the freedom degree of the arrangement positions in the vehicle fore-and-aft direction of the bulk head 64 and the cross member 66 is increased.

Meanwhile, in the sliding door structure 78 according to the third embodiment, the operation and effects accompanying the same structure as that of the sliding door structure 10 according to the above first embodiment should be referred to the explanations of the above first embodiment, and the explanations thereof are omitted herein.

Next, modified examples of the sliding door structure 78 according to the third embodiment are explained hereinafter.

In the above embodiment, the fitting mechanism 80 is formed in the pair of link arms 42 and 44, thereby the movement of the link arm 42 is restricted, meanwhile, an engaging mechanism where engaging each other is performed in at least one of the vehicle vertical direction and the vehicle fore-and-aft direction may be formed in the pair of link arms 42 and 44, thereby the movement of the link arm 42 may be suppressed.

Further, in the above embodiment, the first hinge base 82 and the second hinge base 84 are so structured as to be fitted in the vehicle width direction, meanwhile, by appropriately providing concave and convex portions in the first hinge base 82 and the second hinge base 84, the first hinge base 82 and the second hinge base 84 may be so structured as to be fitted each other at least in one of the vehicle vertical direction and the vehicle fore-and-aft direction.

Moreover, in the above embodiment, in the range at least including the area A1 in the vehicle fore-and-aft direction including the rotating connecting portion P1 with the sliding door 16 of the link arm 42 and the rotating connecting portion P2 with the vehicle body side face 12 of the link arm 44, both the fitting mechanism 80 and the pair of hinge bases 82 and 84 are so structured as to be fitted. Meanwhile, a fitting range of one of the fitting mechanism 80 or the pair of hinge bases 82 and 84 may be smaller than the area A1 in the vehicle fore-and-aft direction.

In addition, in the third embodiment of the invention, the same structure as in the first embodiment may be modified in the same manner as in the first embodiment.

According to another aspect of the invention, there is provided a sliding door structure in which the pair of link arms are arranged in a position at a sliding door side and a position at a vehicle body side face side respectively when the sliding door is at a position to close the door opening, and the movement regulating mechanism regulates movement of the link arm that is arranged in the position at the sliding door side among the pair of link arms, by linkage of the pair of link arms.

In the sliding door structure according to this aspect of the invention, the pair of link arms is arranged in the sliding door side position and the vehicle body side face side position respectively when the sliding door is at the position to close the door opening, and the movement regulating mechanism regulates the movement of the link arm that is arranged at the sliding door side position among the pair of link arms, by the linkage of the pair of link arms ("linkage" includes the meaning of "soft coupling", for example, "hanging on each other", "loosely engaging with each other").

According to this structure, when a load is applied onto the sliding door from the outside of the vehicle owing to a side collision or the like, the movement of the link arm arranged at the sliding door side position, that is arranged at a position closer to the sliding door, is regulated by the linkage of the pair of link arms, and the movement of the link arm that is arranged at this sliding door side position is regulated, thereby the deformation of the sliding door is prevented.

With such a structure, in comparison with the case where the movement of the link arm arranged at the vehicle body side face side position is regulated, the rigidity of the sliding door against a load toward the vehicle inside can be enhanced, and accordingly, it is possible to increase the effect to suppress the deformation of the sliding door against a side collision or the like.

According to another aspect of the invention, there is provided a sliding door structure in which the movement regulating mechanism is structured to have a fitting mechanism having portions which are formed in the pair of link arms respectively and can be fitted each other in a vehicle width direction.

In the sliding door structure according to this aspect of the invention, the movement regulating mechanism is structured to have the portions of the fitting mechanism that are formed in the pair of link arms and can be fitted each other in the vehicle width direction.

According to this structure, when a load is applied onto the sliding door from the outside of the vehicle owing to a side collision or the like and a force is applied to the fitting mechanism in the vehicle width direction, the portions of the fitting mechanism are fitted in the vehicle width direction.

And, the portions of the fitting mechanism are fitted each other in the vehicle width direction, and the movement of the link mechanism is regulated, and thereby the deformation of the sliding door is suppressed.

As mentioned above, the deformation of the sliding door is suppressed by use of a fit force of the fitting mechanism, thereby, it is possible to securely attain the effect to suppress the deformation of the sliding door against a side collision or the like.

According to another aspect of the invention, there is provided a sliding door structure in which the fitting mechanism is formed along a lengthwise direction of the pair of link arms.

In the sliding door structure according to this aspect of the invention, the fitting mechanism is formed along the lengthwise direction of the pair of link arms.

According to this structure, when a load is applied onto the sliding door from the outside of the vehicle owing to a side collision or the like, and a force is applied to the fitting mechanism in the vehicle width direction, the portions of the fitting mechanism are fitted in the vehicle width direction in a wide range along the vehicle fore-and-aft direction.

Accordingly, it is possible to support (receive) a load from the outside of the vehicle applied onto the sliding door owing to a side collision or the like in a wide range along the vehicle fore-and-aft direction by fitting of the fitting mechanism.

Thereby, it is possible to attain the effect to suppress the deformation of the sliding door against a side collision or the like in a wide range in the vehicle fore-and-aft direction.

According to another aspect of the invention, there is provided a sliding door structure in which the movement regulating mechanism is structured to have an engaging mechanism having portions which are formed in the pair of link arms and can be engaged to each other at least in one of a vehicle vertical direction and a vehicle fore-and-aft direction.

In the sliding door structure according to this aspect of the invention, the movement regulating mechanism is structured to have the portions of the engaging mechanism that are formed in the pair of link arms and can be engaged to each other at least in one of the vehicle vertical direction and the vehicle fore-and-aft direction.

According to this structure, when a load is applied onto the sliding door from the outside of the vehicle owing to a side collision or the like, and a force is applied to the engaging mechanism at least in one of the vehicle vertical direction and the vehicle fore-and-aft direction, the portions of the engaging mechanism are engaged to each other at least in one of the vehicle vertical direction and the vehicle fore-and-aft direction.

Due to that the portions of the engaging mechanism are engaged to each other at least in one of the vehicle vertical direction and the vehicle fore-and-aft direction, the movement of the link mechanism is regulated, and thereby the deformation of the sliding door is suppressed.

As mentioned above, the deformation of the sliding door is suppressed by use of the engaging force of the portions of the engaging mechanism, thereby, it is possible to securely attain the effect to suppress the deformation of the sliding door against a side collision or the like.

According to another aspect of the invention, there is provided a sliding door structure in which the engaging portions are formed along a lengthwise direction of the pair of link arms.

In the sliding door structure according to this aspect of the invention, the engaging mechanism is formed along the lengthwise direction of the pair of link arms.

According to this structure, when a load is applied onto the sliding door from the outside of the vehicle owing to a side collision or the like, and a force is applied to the engaging mechanism at least in one of the vehicle vertical direction and the vehicle fore-and-aft direction, the portions of the engaging mechanism are engaged to each other at least in one of the vehicle vertical direction and the vehicle fore-and-aft direction in a wide range along the vehicle fore-and-aft direction.

Accordingly, it is possible to support (receive) a load from the outside of the vehicle applied onto the sliding door owing to a side collision or the like in a wide range along the vehicle fore-and-aft direction by the engagement of the engaging mechanism.

Thereby, it is possible to attain the effect to suppress the deformation of the sliding door against a side collision or the like in a wide range in the vehicle fore-and-aft direction.

According to another aspect of the invention, there is provided a sliding door structure in which the movement regulating mechanism is structured to have a first holding member that is provided at the sliding door along the vehicle fore-and-aft direction and holds one ends of the pair of link arms rotatably, and a second holding member that is provided at the vehicle body side face along the vehicle fore-and-aft direction and holds the other ends of the pair of link arms rotatably, and the first holding member and the second holding member are structured so as to be able to fit with each other in a vehicle width direction or engage each other at least in one of a vehicle vertical direction and the vehicle fore-and-aft direction.

In the sliding door structure according to this aspect of the invention, the movement regulating mechanism is structured to have a first holding member that is provided at the sliding door along the vehicle fore-and-aft direction and holds one ends of the pair of link arms rotatably, and a second holding member that is provided at the vehicle body side face along the vehicle fore-and-aft direction and holds the other ends of the pair of link arms rotatably. The first holding member and the second holding member are structured so as to fit each other in a vehicle width direction or so as to engage each other at least in one of the vehicle vertical direction and the vehicle fore-and-aft direction.

According to this structure, when a load is applied onto the sliding door from the outside of the vehicle owing to a side collision or the like, the first holding member and the second holding member are fitted each other in the vehicle width direction or are engaged to each other at least in one of the vehicle vertical direction and the vehicle fore-and-aft direction, thereby, the movement of the pair of link arms is regulated.

The movement of the pair of link arms is regulated, thereby the deformation of the sliding door is suppressed.

As mentioned above, the deformation of the sliding door is suppressed by use of the fitting force or the engaging force of the first holding member and the second holding member, thereby, it is possible to securely attain the effect to suppress the deformation of the sliding door against a side collision or the like.

Further, when the structure for the first holding member and the second holding member to be fitted or engaged with each other is applied in combination with the fitting mechanism or the engaging mechanism formed in the pair of link arms, it is possible to further enhance the effect to suppress the deformation of the sliding door against a side collision or the like.

According to another aspect of the invention, there is provided a sliding door structure in which the first holding member and the second holding member are structured to have a substantially U-shaped cross section opening in a direction to face each other, both lengthwise-direction end portions of each first hinge pin provided at the one end of each of the pair of link arms are coupled to a pair of wall portions, opposing each other, of the first holding member, and both lengthwise-direction end portions of each second hinge pin provided at the other end of each of the pair of link arms are coupled to a pair of wall portions, opposing each other, of the second holding member.

In the sliding door structure according to this aspect of the invention, the first holding member and the second holding member are structured to have a substantially U-shaped cross section opening in a direction to face each other, and both lengthwise-direction end portions of each first hinge pin provided in the one end of each of the pair of link arms are coupled to a pair of wall portions, opposing each other, of the first holding member, and both lengthwise-direction end portions of each second hinge pin provided in the other end of each of the pair of link arms are coupled to a pair of wall portions, opposing each other, of the second holding member.

According to this structure, when the first holding member and the second holding member are fitted or engaged to each other, even if a force to widen or narrow the wall portions is applied onto the pair of wall portions, opposing each other, of the first holding member, because both of the lengthwise-direction end portions of the first hinge pin are coupled to the pair of wall portions, thereby the pair of wall portions is prevented (suppressed) from widening or narrowing.

In the same manner, when the first holding member and the second holding member are fitted or engaged to each other, even if a force to widen or narrow the wall portions is applied onto the pair of wall portions, opposing each other, of the second holding member, because both of the lengthwise-direction end portions of the second hinge pin are coupled to the pair of wall portions, thereby the pair of wall portions is prevented (suppressed) from widening or narrowing.

Thereby, the fitting force or the engaging force at the moment when the first holding member and the second holding member are fitted or engaged to each other can be maintained, and accordingly, it is possible to prevent the effect to suppress the deformation of the sliding door from decreasing.

According to another aspect of the invention, there is provided a sliding door structure in which the pair of link arms are arranged in a position at a sliding door side and a position at a vehicle body side face side respectively when the sliding door is at a position to close the door opening, and both of the lengthwise-direction ends thereof are rotatably connected to the sliding door and the vehicle body side face respectively, and the movement regulating mechanism is provided at least in a region in the vehicle fore-and-aft direction, the region including: a rotating connecting portion, with respect to the sliding door, of the link arm that is arranged in the position at the sliding door side among the pair of link arms, and a rotating connection portion, with respect to the vehicle body side face, of the link arm that is arranged at the position at the vehicle body side face side among the pair of link arms.

In the sliding door structure according to this aspect of the invention, the pair of link arms is arranged in the sliding door side position and in the vehicle body side face side position respectively when the sliding door is at a position to close the door opening, and both of the lengthwise-direction ends thereof are rotatably connected to the sliding door and the vehicle body side face respectively. The movement regulating mechanism is provided at least in a region in the vehicle fore-and-aft direction. The region includes a rotating connecting portion with the sliding door of the link arm that is arranged in the position at the sliding door side among the pair of link arms, and a rotating connection portion with the vehicle body side face of the link arm that is arranged at the position at the vehicle body side face side among the pair of link arms.

Herein, the rotating connecting portion with the sliding door of the link arm that is arranged in the position at the sliding door side is disposed at a position farther in the vehicle width direction than the vehicle body side face with a length of the link arm in the vehicle width direction, therefore, the rigidity of the rotating connecting portion with the sliding door of the link arm that is arranged in the position at the sliding door side becomes lower than the rotating connection portion with the vehicle body side face of the link arm that is arranged at the position at the vehicle body side face side.

Accordingly, as mentioned above, in a case where the movement regulating mechanism is provided at least in a region in the vehicle fore-and-aft direction, the region including a rotating connecting portion with the sliding door of the link arm that is arranged in the position at the sliding door side among the pair of link arms, and a rotating connection portion with the vehicle body side face of the link arm that is arranged at the position at the vehicle body side face side among the pair of link arms, while the shortage in the rigidity at the rotating connecting portion with the sliding door of the link arm arranged at the sliding door side position is compensated by the rotating connecting portion with the vehicle body side face of the link arm arranged at the sliding door side position, the movement of the pair of link arms is regulated by the movement regulating mechanism.

Thereby, it is possible to attain the effect to suppress the deformation of the sliding door against a side collision or the like, without reinforcing a portion at the rotating connecting portion with the sliding door of the link arm arranged at the sliding door side position.

According to another aspect of the invention, there is provided a sliding door structure in which a load transmitting mechanism is provided at the vehicle body side face, the load transmitting mechanism transmitting the load, which is transmitted from the outside of the vehicle via the sliding door to the movement regulating mechanism, to the inward side of the movement regulating mechanism in a vehicle width direction.

In the sliding door structure according to this aspect of the invention, on the vehicle body side face, a load transmitting mechanism that transmits the load, which is transmitted from the outside of the vehicle via the sliding door to the movement regulating mechanism, to the inward side of the movement regulating mechanism in a vehicle width direction.

According to this structure, when a load is applied onto the sliding door from the outside of the vehicle owing to a side collision or the like, the load, which is transmitted via the sliding door to the movement regulating mechanism, is transmitted to the inside in the vehicle width direction than the movement regulating mechanism by the load transmitting mechanism, and thereby the load applied onto the movement regulating mechanism is dispersed to the inside in the vehicle width direction (the opposite side of the collision).

Thereby, the deformation of the movement regulating mechanism is suppressed, and so, it is possible to prevent the regulating effect to the movement of the link mechanism by the movement regulating mechanism from decreasing. Accordingly, it is possible to maintain the effect to suppress the deformation of the sliding door against a side collision or the like.

According to another aspect of the invention, there is provided a sliding door structure in which the load transmitting mechanism is arranged linearly along the vehicle width direction.

In the sliding door structure according to this aspect of the invention, the load transmitting mechanism is arranged linearly along the vehicle width direction.

According to this structure, when the load, which is transmitted from the outside of the vehicle via the sliding door to the movement regulating mechanism, is transmitted to the inside in the vehicle width direction than the movement regulating mechanism, the load is transmitted linearly in the vehicle width direction, the transmission loss of the load can be decreased. Accordingly, the load applied onto the movement regulating mechanism is dispersed efficiently to the inside in the vehicle width direction.

Thereby, the deformation of the movement regulating mechanism is suppressed further preferably, and so, it is possible to further preferably prevent the regulating effect to the movement of the link mechanism by the movement regulating mechanism from decreasing. Accordingly, it is possible to securely maintain the effect to suppress the deformation of the sliding door against a side collision or the like.

According to another aspect of the invention, there is provided a sliding door structure in which a cross member is arranged along a vehicle width direction in the inside in the vehicle width direction at a position in the vehicle fore-and-aft direction where the movement regulating mechanism is arranged.

In the sliding door structure according to this aspect of the invention, in the inside in the vehicle width direction at the vehicle fore-and-aft position where the movement regulating mechanism is disposed, a cross member is disposed along the vehicle width direction.

According to this structure, when a load is applied onto the sliding door from the outside of the vehicle owing to a side collision or the like, the load, which is transmitted via the sliding door to the movement regulating mechanism, is transmitted to the inside in the vehicle width direction than the movement regulating mechanism by the cross member, and thereby the load applied onto the movement regulating mechanism is dispersed to the inside in the vehicle width direction.

Thereby, the deformation of the movement regulating mechanism is suppressed, and so, it is possible to prevent the regulating effect to the movement of the link mechanism by the movement regulating mechanism from decreasing. Accordingly, it is possible to maintain the effect to suppress the deformation of the sliding door against a side collision or the like.

Especially, when the cross member is arranged in the inside in the vehicle width direction of the load transmitting mechanism, the load applied onto the movement regulating mechanism is further dispersed to the inside in the vehicle width direction.

Thereby, the deformation of the movement regulating mechanism is suppressed further preferably, and so, it is possible to further preferably prevent the regulating effect to the movement of the link mechanism by the movement regulating mechanism from decreasing. Accordingly, it is possible to securely maintain the effect to suppress the deformation of the sliding door against a side collision or the like.

According to another aspect of the invention, there is provided a sliding door structure in which the fitting mechanism includes a convex portion and a concave portion which are able to fit with each other, the convex portion and the concave portion being provided at the pair of link arms respectively.

In the sliding door structure according to this aspect of the invention, the fitting mechanism includes the convex portion and the concave portion which are able to fit with each other, the convex portion and the concave portion being provided at the pair of link arms respectively.

According to this structure, when a load is applied onto the sliding door from the outside of the vehicle owing to a side collision or the like and a force is applied to the fitting mechanism in the vehicle width direction, the convex portion and the concave portion of the fitting mechanism are fitted in the vehicle width direction.

And, the convex portion and the concave portion of the fitting mechanism are fitted each other in the vehicle width direction, and the movement of the link mechanism is regulated, and thereby the deformation of the sliding door is suppressed.

As mentioned above, the deformation of the sliding door is suppressed by use of a fit force of the convex portion and the concave portion of the fitting mechanism, thereby, it is possible to securely attain the effect to suppress the deformation of the sliding door against a side collision or the like.

According to another aspect of the invention, there is provided a sliding door structure in which edge portions of a pair of wall portions facing each other formed at one of the first holding member and the second holding member are inclined inward so as to come closer to each other, and edge portions of a pair of wall portions facing each other formed at the other of the first holding member and the second holding member are inclined outward so as to go further away from each other.

In the sliding door structure according to this aspect of the invention, the edge portions of the pair of wall portions facing each other formed at one of the first holding member and the second holding member are inclined inward so as to come closer to each other, and the edge portions of the pair of wall portions facing each other formed at the other of the first holding member and the second holding member are inclined outward so as to go further away from each other.

According to this structure, when a load is applied onto the sliding door from the outside of the vehicle owing to a side collision or the like, the first holding member and the second holding member are fitted each other, and the edge portions of the pair of wall portions facing each other formed at one of the first holding member and the second holding member and the edge portions of the pair of wall portions facing each other formed at the other of the first holding member and the second holding member are fitted, thereby, the movement of the pair of link arms is regulated.

The movement of the pair of link arms is regulated, thereby the deformation of the sliding door is suppressed.

As mentioned above, the deformation of the sliding door is suppressed by use of the fitting force of the edge portions of the pair of wall portions facing each other formed at one of the first holding member and the second holding member and the edge portions of the pair of wall portions facing each other formed at the other of the first holding member and the second holding member, thereby, it is possible to securely attain the effect to suppress the deformation of the sliding door against a side collision or the like.

According to another aspect of the invention, there is provided a sliding door structure in which the movement regulating mechanism is structured to have a first holding member that is provided at the sliding door along the vehicle fore-and-aft direction and holds one ends of the pair of link arms rotatably, and a second holding member that is provided at the vehicle body side face along the vehicle fore-and-aft direction and holds the other ends of the pair of link arms rotatably, and the load transmitting mechanism is structured to have a fixing member that fixes the second holding member to the vehicle body side face and a bulk head provided at the inner side of the fixing member in the vehicle width direction.

In the sliding door structure according to this aspect of the invention, the movement regulating mechanism is structured to have the first holding member that is provided at the sliding door along the vehicle fore-and-aft direction and holds one ends of the pair of link arms rotatably, and the second holding member that is provided at the vehicle body side face along the vehicle fore-and-aft direction and holds the other ends of the pair of link arms rotatably, and the load transmitting mechanism is structured to have the fixing member that fixes the second holding member to the vehicle body side face and the bulk head provided at the inner side of the fixing member in the vehicle width direction.

According to this structure, when the load, which is transmitted from the outside of the vehicle via the sliding door to the movement regulating mechanism including the fixing member and the bulk head, is transmitted to the inside in the vehicle width direction than the movement regulating mechanism, the load is transmitted linearly in the vehicle width direction, the transmission loss of the load can be decreased. Accordingly, the load applied onto the movement regulating mechanism is dispersed efficiently to the inside in the vehicle width direction.

Thereby, the deformation of the movement regulating mechanism is suppressed further preferably, and so, it is possible to further preferably prevent the regulating effect to the movement of the link mechanism by the movement regulating mechanism from decreasing. Accordingly, it is possible to securely maintain the effect to suppress the deformation of the sliding door against a side collision or the like.

According to another aspect of the invention, there is provided a sliding door structure in which the engaging mechanism is structured to have a first engaging portion and a second engaging portion which are able to fit with each other, the first engaging portion having a lower protruding portion in the vehicle vertical direction, and the second engaging portion having an upper protruding portion in the vehicle vertical direction.

In the sliding door structure according to this aspect of the invention, the engaging mechanism is structured to have the first engaging portion and the second engaging portion which are able to fit with each other, the first engaging portion having the lower protruding portion in the vehicle vertical direction, and the second engaging portion having the upper protruding portion in the vehicle vertical direction.

According to this structure, when a load is applied onto the sliding door from the outside of the vehicle owing to a side collision or the like, and a force is applied to the engaging mechanism at least in one of the vehicle vertical direction and the vehicle fore-and-aft direction, the first and second engaging portions having the lower and upper protruding portions of the engaging mechanism are engaged to each other at least in one of the vehicle vertical direction and the vehicle fore-and-aft direction.

Due to that the first and second engaging portions having the lower and upper protruding portions of the engaging mechanism are engaged to each other at least in one of the vehicle vertical direction and the vehicle fore-and-aft direction, the movement of the link mechanism is regulated, and thereby the deformation of the sliding door is suppressed.

As mentioned above, the deformation of the sliding door is suppressed by use of the engaging force of the first and second engaging portions having the lower and upper protruding portions of the engaging mechanism, thereby, it is possible to securely attain the effect to suppress the deformation of the sliding door against a side collision or the like.

What is claimed is:

1. A sliding door structure comprising:
   a sliding door that opens and closes a door opening provided at a vehicle body side face;
   a link mechanism that is provided between the vehicle body side face and the sliding door and makes the sliding door slide in a vehicle fore-and-aft direction by at least one pair of link arms; and
   a movement regulating mechanism, provided at the link mechanism, that regulates movement of the link mechanism when a load is applied onto the sliding door from outside of the vehicle.

2. A sliding door structure according to claim 1, wherein
   the pair of link arms are arranged in a position at a sliding door side and a position at a vehicle body side face side respectively when the sliding door is at a position to close the door opening, and
   the movement regulating mechanism regulates movement of the link arm that is arranged in the position at the sliding door side among the pair of link arms, by linkage of the pair of link arms.

3. A sliding door structure according to claim 1, wherein the movement regulating mechanism is structured to have a fitting mechanism having portions which are formed in the pair of link arms respectively and can be fitted each other in a vehicle width direction.

4. A sliding door structure according to claim 3, wherein the fitting mechanism is formed along a lengthwise direction of the pair of link arms.

5. A sliding door structure according to claim 1, wherein the movement regulating mechanism is structured to have an engaging mechanism having portions which are formed in the pair of link arms and can be engaged to each other at least in one of a vehicle vertical direction and a vehicle fore-and-aft direction.

6. A sliding door structure according to claim 5, wherein the engaging portions are formed along a lengthwise direction of the pair of link arms.

7. A sliding door structure according to claim 1, wherein
   the movement regulating mechanism is structure to have a first holding member that is provided at the sliding door along the vehicle fore-and-aft direction and holds one ends of the pair of link arms rotatably, and a second holding member that is provided at the vehicle body side face along the vehicle fore-and-after direction and holds the other ends of the pair of link arms rotatably, and
   the first holding member and the second holding member are structured so as to be able to fit with each other in a vehicle width direction or engage each other at least in one of a vehicle vertical direction and the vehicle fore-and-aft direction.

8. A sliding door structure according to claim 7, wherein
   the first holding member and the second holding member are structured to have a substantially U-shaped cross section opening in a direction to face each other,
   both lengthwise-direction end portions of each first hinge pin provided at the one end of each of the pair of link arms are coupled to a pair of wall portions, opposing each other, of the first holding member, and
   both lengthwise-direction end portions of each second hinge pin provided at the other end of each of the pair of link arms are coupled to a pair of wall portions opposing each other, of the second holding member.

9. A sliding door structure according to claim 1, wherein
   the pair of link arms are arranged in a position at a sliding door side and a position at a vehicle body side face side respectively when the sliding door is at a position to close the door opening, and both of the lengthwise-direction ends thereof are rotatably connected to the sliding door and the vehicle body side face respectively, and
   the movement regulating mechanism is provided at least in a region in the vehicle fore-and-aft direction, the region including:
      a rotating connecting portion, with respect to the sliding door, of the link arm that is arranged in the position at the sliding door side among the pair of link arms, and
      a rotating connection portion, with respect to the vehicle body side face, of the link arm that is arranged at the position at the vehicle body side face side among the pair of link arms.

10. A sliding door structure according to claim 1, wherein a load transmitting mechanism is provided at the vehicle body side face, the load transmitting mechanism transmitting the load, which is transmitted from the outside of the vehicle via the sliding door to the movement regulating mechanism, to the inward side of the movement regulating mechanism in a vehicle width direction.

11. A sliding door structure according to claim 10, wherein the load transmitting mechanism is arranged linearly along the vehicle width direction.

12. A sliding door structure according to claim 1, wherein a cross member is arranged along a vehicle width direction in the inside in the vehicle width direction at a position in the vehicle fore-and-aft direction where the movement regulating mechanism is arranged.

13. A sliding door structure according to claim 3, wherein the fitting mechanism includes a convex portion and a concave portion which are able to fit with each other, the convex portion and the concave portion being provided at the pair of link arms respectively.

14. A sliding door structure according to claim 7, wherein
    edge portions of a pair of wall portions facing each other formed at one of the first holding member and the second holding member are inclined inward so as to come close to each other, and
    edge portions of a pair of wall portions facing each other formed at the other of the first holding member and the second holding member are inclined outwards so as to go further away from each other.

15. A sliding door structure according to claim 11, wherein
    the movement regulating mechanism is structured to have a first holding member that is provided at the sliding door along the vehicle fore-and-aft direction and holds one ends of the pair of link arms rotatably, and a second holding member that is provided at the vehicle body side face along the vehicle fore-and-after direction and holds the other ends of the pair of link arms rotatably, and
    the load transmitting mechanism is structure to have a fixing member that fixes the second holding member to the vehicle body side face and a bulk head provided at the inner side of the fixing member in the vehicle width direction.

16. A sliding door structure according to claim 5, wherein the engaging mechanism is structured to have a first engaging portion and a second engaging portion which are able to fit with each other, the first engaging portion having a lower protruding portion in the vehicle vertical direction, and the second engaging portion having an upper protruding portion in the vehicle vertical direction.

17. A sliding door structure according to claim 9, wherein the movement regulating mechanism is structured to have a fitting mechanism having portions which are formed in the pair of link arms respectively and can be fitted with each other in a vehicle width direction.

18. A sliding door structure according to claim 9, wherein the movement regulating mechanism is structured to have
    a first holding member that is provided at the sliding door along the vehicle fore-and-aft direction and holds one ends of the pair of link arms rotatably, and a second holding member that is provided at the vehicle body side face along the vehicle fore-and-aft direction and holds the other ends of the pair of link arms rotatably, and
    the first holding member and the second holding member are structured so as to fit each other in a vehicle width direction or engage each other at least in one of a vehicle vertical direction and the vehicle fore-and-aft direction.

19. A sliding door comprising:
    a sliding door that opens and closes a door opening provided at a vehicle body side face;
    a link mechanism that is provided between the vehicle body side face and the sliding door and makes the sliding door slide in a vehicle fore-and-aft direction by at least one pair of link arms; and
    a movement regulating mechanism that regulates movement of the link mechanism when a load is applied onto the sliding door from outside of the vehicle,
    wherein the movement regulating mechanism comprises:
        portions which are formed in the pair of link arms respectively and can be fitted or engaged with each other, and
        a first holding member that is provided at the sliding door along the vehicle fore-and-aft direction and hold one ends of the pair of link arms rotatably, and a second holding member that is provided at the vehicle body side face along the vehicle fore-and-aft direction and holds the other ends of the pair of link arms rotatably,
        wherein the first holding member and the second holding member are structured to fit or engage with each other.

\* \* \* \* \*